US012171366B1

(12) United States Patent
Thai et al.

(10) Patent No.: US 12,171,366 B1
(45) Date of Patent: Dec. 24, 2024

(54) FOOD AND BEVERAGE PREPARATION SEQUENCE RECORDING AND PLAYBACK

(71) Applicant: BREVILLE PTY LIMITED, Alexandria (AU)

(72) Inventors: Khon Thai, Sydney (AU); David Davenport, Sydney (AU); Eddie Siu, Sydney (AU); Robert Grassia, Alexandria (AU); Ashley Marsh-Croft, Alexandria (AU); Lochana Subasekara, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 0 days.

(21) Appl. No.: 18/087,349

(22) Filed: Dec. 22, 2022

Related U.S. Application Data

(63) Continuation of application No. 15/525,137, filed as application No. PCT/AU2015/000670 on Nov. 6, 2015, now abandoned.

(30) Foreign Application Priority Data

Nov. 7, 2014 (AU) .............................. 2014904483
Feb. 26, 2015 (AU) .............................. 2015900673

(51) Int. Cl.
*A47J 31/00* (2006.01)
*A47J 27/21* (2006.01)
(Continued)

(52) U.S. Cl.
CPC ......... *A47J 36/32* (2013.01); *A47J 27/21083* (2013.01); *A47J 31/002* (2013.01);
(Continued)

(58) Field of Classification Search
CPC ...... A47J 36/32; A47J 27/21083; A47J 31/42; A47J 31/52; A47J 37/0629; A47J 43/046; A47J 43/0716; H05B 1/0258; H05B 6/062
See application file for complete search history.

(56) References Cited

U.S. PATENT DOCUMENTS 4,585,925 A 4/1986 Andre
4,747,690 A 5/1988 Hayashi
(Continued)

FOREIGN PATENT DOCUMENTS

DE 102010037769 A1 3/2012
EP 1489479 A1 12/2004
(Continued)

OTHER PUBLICATIONS

Chinese Office Action for application No. 201580072694.2 mailed Jan. 17, 2019.
(Continued)

*Primary Examiner* — Steven N Leff
(74) *Attorney, Agent, or Firm* — Patterson + Sheridan, LLP

(57) ABSTRACT

The present disclosure relates to the operation of a kitchen appliance (100). A processor (122) receives (220) a stored sequence of user settings and at least one recorded parameter, and applies (226) the stored sequence of user settings to the kitchen appliance. A sensor (140) senses at least one sensed parameter while the stored sequence of user settings is applied to the kitchen appliance (100). The processor (122) determines (228) a difference between the at least one sensed parameter and corresponding recorded parameter(s) and, if the determined difference exceeds a difference threshold, adjusts (234) at least one user setting applied.

11 Claims, 11 Drawing Sheets

(51) Int. Cl.

| | | |
|---|---|---|
| *A47J 31/42* | (2006.01) | |
| *A47J 31/52* | (2006.01) | |
| *A47J 36/32* | (2006.01) | |
| *A47J 37/06* | (2006.01) | |
| *A47J 43/046* | (2006.01) | |
| *A47J 43/07* | (2006.01) | |
| *B01F 35/21* | (2022.01) | |
| *B01F 35/212* | (2022.01) | |
| *B01F 35/22* | (2022.01) | |
| *B01F 35/92* | (2022.01) | |
| *B01F 35/93* | (2022.01) | |
| *H05B 1/02* | (2006.01) | |
| *H05B 6/06* | (2006.01) | |
| *B01F 35/90* | (2022.01) | |

(52) U.S. Cl.
CPC ............... *A47J 31/42* (2013.01); *A47J 31/52* (2013.01); *A47J 36/321* (2018.08); *A47J 37/0629* (2013.01); *A47J 43/046* (2013.01); *A47J 43/0716* (2013.01); *B01F 35/2115* (2022.01); *B01F 35/212* (2022.01); *B01F 35/2209* (2022.01); *B01F 35/92* (2022.01); *B01F 35/93* (2022.01); *H05B 1/0258* (2013.01); *H05B 6/062* (2013.01); *B01F 2035/99* (2022.01); *H05B 2213/07* (2013.01)

(56) References Cited

U.S. PATENT DOCUMENTS

| | | |
|---|---|---|
| 5,128,521 A | 7/1992 | Lanno et al. |
| 5,802,957 A | 9/1998 | Wanat et al. |
| 6,142,666 A | 11/2000 | Koether et al. |
| 6,402,365 B1 | 6/2002 | Wong |
| 6,486,453 B1 | 11/2002 | Bales et al. |
| 6,656,515 B2 | 12/2003 | Lowry et al. |
| 6,953,919 B2 | 10/2005 | Clothier |
| 8,136,442 B2 * | 3/2012 | Strutin-Belinoff ...... F24C 7/082 219/720 |
| 8,529,118 B2 * | 9/2013 | Davis .................... A47J 43/046 366/205 |
| 10,201,790 B2 * | 2/2019 | Hoare ................. B01F 35/2209 |
| 2002/0009017 A1 | 1/2002 | Kolar et al. |
| 2005/0193901 A1 | 9/2005 | Buehler |
| 2008/0274240 A1 | 11/2008 | Germouni et al. |
| 2009/0258331 A1 | 10/2009 | Do et al. |
| 2009/0258332 A1 | 10/2009 | Do et al. |
| 2010/0006561 A1 | 1/2010 | Hensel et al. |
| 2012/0034360 A1 | 2/2012 | Israni |
| 2014/0314921 A1 | 10/2014 | Kuempel et al. |
| 2014/0335243 A1 * | 11/2014 | Israni ..................... A21C 1/003 426/233 |
| 2015/0148980 A1 * | 5/2015 | Singer .................... G05B 15/02 99/337 |

FOREIGN PATENT DOCUMENTS

| | | |
|---|---|---|
| WO | 2011055189 A2 | 5/2011 |
| WO | 2012174595 A1 | 12/2012 |
| WO | 2013020162 A1 | 2/2013 |
| WO | 2014016117 A1 | 1/2014 |

OTHER PUBLICATIONS

European Patent Examination Report for Patent Application No. 15856864.2, May 24, 2018.

International Search Report mailed Feb. 2, 2016 for PCT Application No. PCT/AU2015/000670.

* cited by examiner

FOOD AND BEVERAGE PREPARATION SEQUENCE RECORDING AND PLAYBACK

TECHNICAL FIELD

The present invention relates generally to kitchen appliances used in the preparation of food and beverage, and having settings that may be adjusted by a user. More particularly, the present invention relates to such kitchen appliances where a sequence of settings adjusted by the user, together with operating parameters of the kitchen appliance, are recorded and stored as a preparation sequence. The preparation sequence may later be replayed on the kitchen appliance, in which case the kitchen appliance repeats the preparation sequence, and hence the sequence of settings as previously adjusted by the user.

BACKGROUND

The complexity of the manner in which kitchen appliances are being used is ever increasing. Many kitchen appliances contain processors for controlling the operation thereof, and a memory for storing predefined settings used on a regular basis. This enables a user to select one of the predefined settings, causing the processor to retrieve the predefined settings and control components of the appliance accordingly. More sophisticated predefined settings may include a sequence of settings, in which case the various settings are changed during operation according to the sequence.

However, the predefined settings are typically stored in the memory of the kitchen appliance during manufacture. Kitchen appliances exist having removable memories, thereby allowing users to add further predefined settings to the appliance. However, those arrangements allow little to no flexibility for a user to make changes to the settings, or to store new settings.

Often complex preparation sequences are performed by the user using such kitchen appliances, with the preparation sequences including numerous setting changes. In food and beverage preparation repeatability is desirable. For that reason, appliances have been developed having the ability for the user to record the preparation sequence. Recorded preparation sequences may later be replayed, in which case the setting changes are repeated with little or no user input.

However, the steps required to be performed m order to record the preparation sequence are often laborious.

Also, the recorded preparation sequence relates to a specific operating environment.
During the replay of the recorded sequence variations in ingredients, for example, may cause undesirable results. As an example, if the quantities of the ingredients used during replay of the recorded preparation sequence do not correspond to the quantities used during recording of the sequence, a required temperature may not be reached and maintained for a required amount of time, causing a meal to be undercooked.

SUMMARY

The term "preparation" as used herein refers to all aspects of food and/or beverage preparation including, but not limited to, grinding, cutting, kneading, milling, mixing, and cooking.

According to an aspect of the present disclosure, there is provided a method of operating a kitchen appliance, the method comprising the steps of:
  receiving at a processor a stored sequence of user settings and at least one recorded parameter;
  applying at the processor the stored sequence of user settings to the kitchen appliance; with a sensor, sensing at least one sensed parameter while the stored sequence of user settings is applied to the kitchen appliance;
  determining at the processor a difference between the at least one sensed parameter and corresponding recorded parameter(s); and
  if the determined difference between the at least one sensed parameter and corresponding recorded parameter(s) exceeds a difference threshold, adjusting at the processor at least one user setting applied.

According to another aspect of the present disclosure, there is provided a method of composing a recipe, the method comprising the steps of:
  receiving at a processor a stored variation of at least one recorded parameter;
  segmenting at the processor the stored variation of the at least one recorded parameter into preparation segments; and
  presenting on a user interface the preparation segments as distinct recipe steps.

According to another aspect of the present disclosure, there is provided a method of operating a kitchen appliance, the method comprising the steps of:
  receiving at a processor a stored sequence of user settings associated with a recorded parameter;
  receiving at the processor a user input modification of the user settings and storing a modified sequence of user settings;
  determining at the processor a modified recorded parameter based on the modification;
  on a user interface including a display, displaying the modified recorded parameter as visual feedback to a user of the modification; and
  using a controller, applying the modified stored sequence of user settings to the kitchen appliance.

According to another aspect of the present disclosure, there is provided a method of operating a kitchen appliance, the method comprising the steps of:
  receiving a sequence of user settings;
  applying the sequence of user settings to the kitchen appliance;
  upon completion of applying the sequence of user settings, receiving a user command for additional operation;
  in response to the user command for additional operation, re-applying the user settings applied prior to completion for a reduced period of time; and
  saving the sequence of user settings with the re-applied user settings appended thereto.

According to another aspect of the present disclosure, there is provided a kitchen appliance for implementing each of the above methods.

According to another aspect of the present disclosure, there is provided a kitchen appliance comprising:
  a powered element for processing a food substance;
  a sensor for sensing a property associated with the powered element; and
  a controller for controlling the powered element according to a control profile, the control profile having at least two segments, wherein a transition for a current segment to a next segment is effected upon the property sensed by the sensor satisfying at least one transition criterion.

Other aspects of the invention are also disclosed.

BRIEF DESCRIPTION OF THE DRAWINGS

One or more embodiments of the present invention will now be described with reference to the drawings, in which.

DESCRIPTION OF EMBODIMENTS

Kitchen appliances exist having the ability for a user to record a preparation sequence for later replay. However, the steps required to be performed in order to record the preparation sequence are often complex. The complexity is exacerbated by the fact that most kitchen appliances have user interfaces with limited controls and display capabilities. Users are therefore discouraged to set the kitchen appliance to record a processing sequence.

Success in the preparation of food and beverages often results from continual experimentation with different preparation sequences, involving varying the settings of the appliance, as well as time differences between setting changes. As a result, only after the preparation sequence is completed does the user know whether the sequence was successful. Thus, the user either has to record many sequences, only to discard most due to less than desirable outcomes, or end up with a successful outcome, but having neglected to commence the recording of the preparation sequence.

In order to simplify the user interface with respect to recording of the processing sequence, the kitchen appliance 100 disclosed herein automatically records a sequence of user settings and sensed parameters while in operation. The kitchen appliance provides the user thereof with an option to store the recorded sequence. The stored sequence may later be retrieved and replayed on demand, in which case the kitchen appliance repeats the sequence of settings.

Furthermore, ingredients used in recipes are not always consistent. For example, the size of ingredients, specifically fruit and vegetables, may vary significantly. Also, the temperature of some ingredients may be different to that used when the processing sequence was recorded. Other differences may for example include the ripeness of the fruit used, or the quality or type of flour used which in turn affects the liquid absorbance of the flour.

the operational environment such as temperature and humidity may also be different to the operational environment experienced when the preparation sequence was recorded.

such differences may significantly affect the repeatability of the recipe when the preparation sequence is replayed. For example, the time taken to boil very large potatoes would be significantly longer than medium sized potatoes. In an attempt to compensate for changes in ingredients and/or operational environment, the kitchen appliance 100 disclosed herein, while replaying a recorded sequence of user settings, compares parameters stored when the sequence of settings were recorded with sensed parameters, and upon detecting a difference between the stored parameters and sensed parameters, may adjust user settings in the sequence.

1. Overview of a Kitchen Appliance with Recording Functionality

Figure 1:
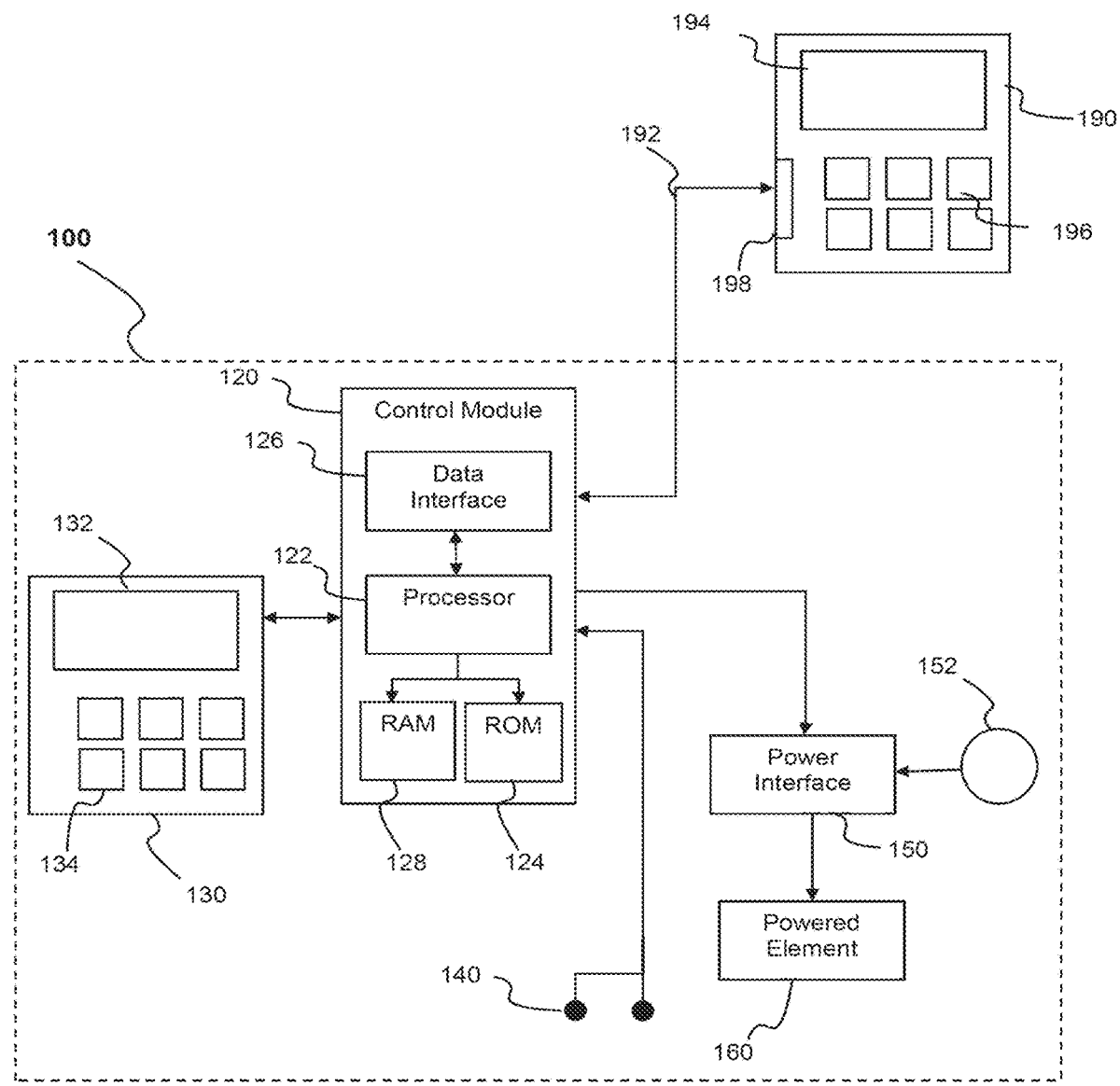
FIG. 1 shows a schematic block diagram of a kitchen appliance having record and replay features according to the present disclosure.

FIG. 1 shows a schematic block diagram of the kitchen appliance 100 having record and replay features according to the present disclosure. The kitchen appliance 100 has a control module 120 which includes a processor 122, and memory in the fun of Read Only Memory (ROM) 124, which typically comprises non-volatile memory, such as flash memory, or any other suitable electrically erasable programmable memory (EEPROM), as well as Random Access Mammy (RAM) 128, coupled to the processor 122. In the preferred implementation the processor 122 is an ARM based microcontroller that includes an external bus for interfacing to the ROM 124 and the RAM 128, as well as external devices. The processor 122 comprises hardware logic, and software to implement the functionality described below. The ROM 124 and RAM 128 are used to store the sequence of user settings and both recorded and sensed parameters as is described below.

The kitchen appliance 100 further includes a user interface 130 operably connected to the control module 120. The user interface 130 includes a display 132 and user controls 134. The display 132 may be a Liquid Crystal Display (LCD), and/or merely a number of Light Emitting Diodes (LEDs) to provide user prompts and feedback. The user controls 134 may be a touch-screen element, and/or various switches and dials. Each of the switches and dials may be single- or multi-function controls.

Controlling Operation of the Appliances:

The control module 120 also interfaces with and controls a power interface 150 of the kitchen appliance 100. The power interface 150 controls how power is supplied from a power source 152 to one or more powered elements 160, such as motors, heater elements, pumps and actuators. Examples of various kitchen appliances are described below, as well as the forms the one or more powered elements 160 take within those kitchen appliances. By controlling the supply of power to the one or more powered elements 160, the power interface 150, under control of the processor 122, controls the operation of the one or more powered elements 160. For example, if the powered element 160 is a motor (not illustrated), the power interface 150, under control of the processor 122, controls the speed of a rotor of the motor.

Using Sensors:

The kitchen appliance 100 further includes one or more sensors 140 for seism venous parameters of the appliance 100 during operation, and providing those parameters to the control module 120, and in particular to the processor 122. Such parameters may include speed, pressure, temperature, etc. The parameters may be used directly in the control of the powered elements 160, for example a speed sensor may be used to provide feedback when controlling the rotational speed of a motor. The parameters may alternatively be used as triggers within the sequence, for example after a heating element is controlled to heat water to a predefined temperature sensed with a temperature sensor, a pump is activated to pump the water.

Sensor measurements are also used when operational sequences of the appliance 100 are recorded and when these recordings are edited and/or played back as described elsewhere herein.

Including a Computing Device:

In a preferred implementation, the control module 120 further includes a data interface 126 for allowing communication between the control module 120 and a remote computing device 190, such as a tablet computer. The communication is over a bidirectional data link 192, preferably a wireless data link such as Wi-Fi. The data link may also be wired (such as Ethernet), or may use a different wireless protocol such as Bluetooth. The remote computing device 190 also has a data interface 198, as well as a display 194 and controls 196. In the preferred implementation where the remote computing device 190 is a tablet computer, the controls 196 take the form of a touch-screen.

Modifying Recordings:

The remote computing device 190 may be used to edit recorded preparation sequences. In a manner described elsewhere herein, settings and/or parameters within the recorded preparation sequence may be modified, or the preparation sequence may be annotated to guide the user while replaying the sequence, for example prompting the user to add an ingredient to a mixture.

Having described the kitchen appliance 100 generally, the operation of the appliance 100 under control of the control module 122 is now described in more detail. More particularly, the automatic recording of a sequence of user settings and sensed parameters is described first, followed by the manner in which user settings are adjusted while replaying a recorded sequence of user settings upon detecting a difference between stored parameters and sensed parameters, and then followed by methods of modifying recorded sequences.

2. Recording a Food Preparation Sequence

Initiating Auto-Record:

In the preferred implementation the automatic recording of a sequence of user settings and sensed parameters is initiated upon receipt by the kitchen appliance 100 of a first user setting change after power up. All user settings and sensor parameters from sensor measurements are recorded as a food preparation sequence into the RAM 128. At the same time, the power interface 150 (FIG. 1) is controlled by the control module 120 to effect the user settings as appropriate. The time intervals between user settings and/or sensor parameters are also recorded within the sequence.

Ending Recordings:

Following the recording of the user settings and sensed parameters into the RAM 128, the processor 122 detentions whether the kitchen appliance has been in a passive state for a predefined time period. The passive state is typically a state in which the kitchen appliance is still powered, but all operations have terminated. If it is determined by the processor 122 that the kitchen appliance is not in a passive state, or has been in the passive state for less than the predefined time period, then further user settings and sensed parameters are added to the recorded sequence in the RAM 128.

If the processor 122 determines that the kitchen appliance has been in the passive state for the predefined time period, then the processor 122 controls the display 132 to prompt the user with a message confirming the end of the food preparation/cooking sequence, and/or questioning the user whether the recorded sequence is to be saved, or edited and saved, for future replay.

Preferably, an "Edit and Save" button or menu option (not illustrated) is provided. Upon detecting that the "Edit and Save" option has been selected, the user is provided with one or more options including: 1) saving the recorded sequence, 2) carry on recording the sequence (since the sequence is not finished yet), 3) edit the recorded sequence before saving the edited sequence, etc. In some embodiments, as an alternative to (or in addition to) determining the passive state predefined time period, a button or menu option is available to the user to indicate that recording has finished, thereby calling up the "Edit and Save" post-recording options.

Upon receiving a command to save the recorded sequence, including after the recorded sequence has been edited, that sequence is saved with a unique identifier. The unique identifier may be a user provided identifier received from the user interface 130. Alternatively a user definable button may be pressed by the user, and the processor 122 assigns the recorded sequence to that button and saves the recorded sequence to the ROM 124.

in some embodiments, where limited appliance memory (ROM 124) is available, additional recorded sequences may be saved remotely to the remote computing device 190. When the sequence is modified, it will then be modified with and saved on the remote computing device (see additional description regarding modifying sequences elsewhere herein). When the sequence is played back, it will be loaded from the remote computing device 190 into the appliance RAM 128 (in some embodiments via the local ROM 124).

3. Replaying a Recorded Sequence

Figure 2:
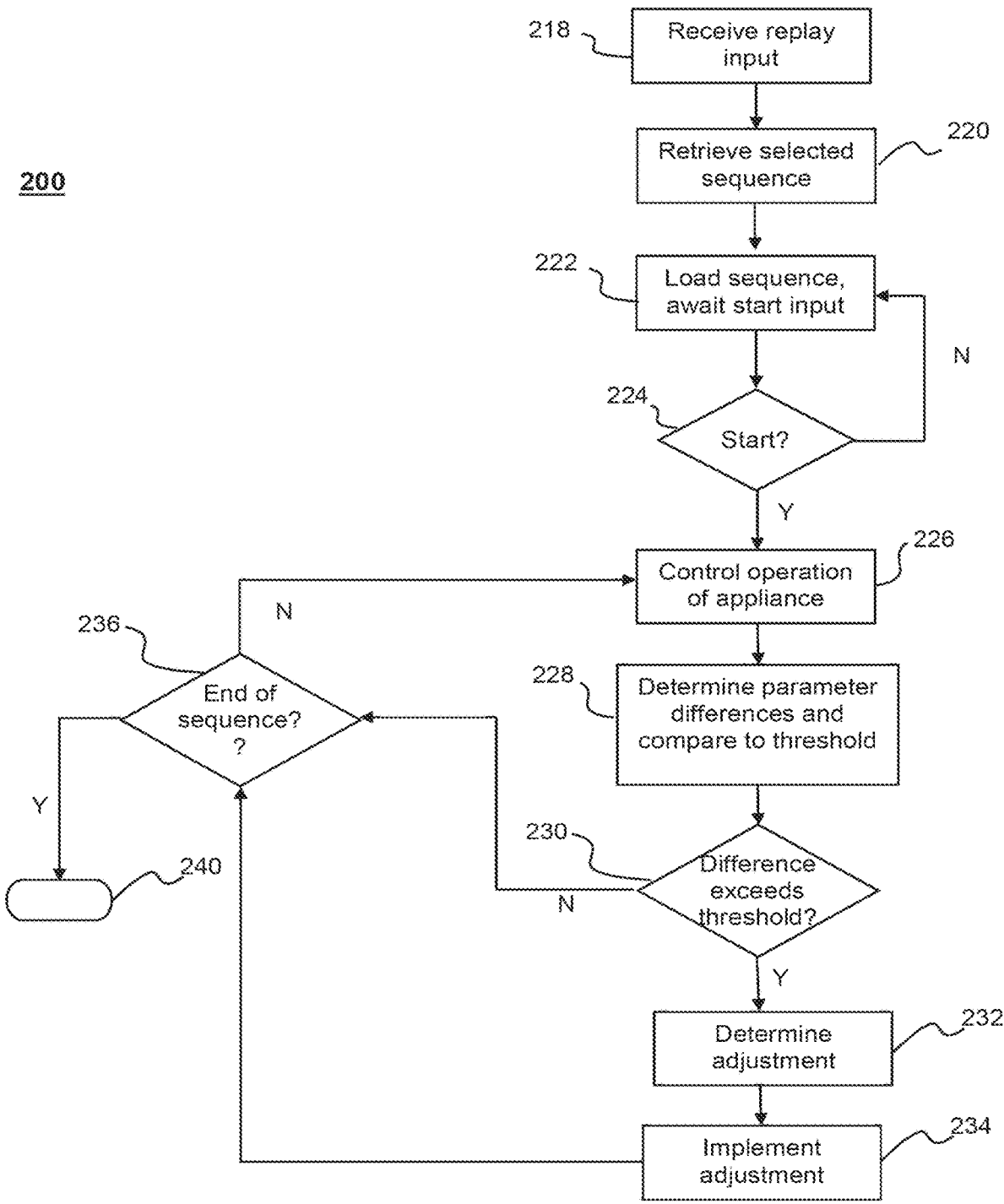
FIG. 2 shows a schematic flow diagram of a process of controlling the operation of the kitchen appliance shown in FIG. 1.

FIG. 2 shows a schematic flow diagram of a process 200, performed by the processor 122, of controlling the operation of the kitchen appliance 100 to adjust user settings while replaying a recorded sequence of user settings. Also included in process 200 is the response to detecting a difference between stored parameters and sensed parameters. The process 200 is implemented as software, stored in the ROM 124 (FIG. 1), and executed within the processor 122.

Process 200 is initialized when the kitchen appliance 100 is placed in a "replay" mode. The mode of the kitchen appliance 100 may be toggled between a user operated and replay modes via user interaction with the controls 134 (FIG. 1). Process 200 starts in step 218 where the processor 122 receives a user selection of a recorded sequence. Upon receipt of a user selection of a recorded sequence, the recorded sequence is retrieved from the ROM 124 in step 220. In step 222 the sequence is loaded for execution, and the processor 122 awaits a start input from the user. Next, in step 224, the processor 122 determines whether a user input has been received that indicates that the replay of the selected recorded sequence is to start, for example by the user depressing a start button (not illustrated).

Upon receiving user input indicative that the replay of the selected recorded sequence is to start, one or more steps (or segments) of the recorded sequence are executed whereby the control module 120 controls (at step 226):

(1) The display 132 on the user interface 130, for example to provide recipe instructions According to annotations added to the original recording, and/or (2) The power interface 150 according to the settings of the recorded sequence. The power interface 150 in turn controls the operation of the one or more powered elements 160, to replicate the recorded sequence.

Where a user setting is associated with a recorded parameter, and a corresponding parameter is sensed, then the recorded and sensed parameters are compared in step 228.

Processor 122 determines the difference between one or more pairs of recorded parameters and corresponding sensed parameters sensed using sensors 140. The processor 122 also determines whether the difference between at least one pair of parameters exceeds a predefined threshold. If it is determined that the difference between the relevant pair(s) of parameters does not exceed the predefined threshold, then processing continues to step 236 where the processor 122 determines whether all the settings in the sequence have been used in controlling the operation of the appliance. If all the settings in the sequence have been used, the process 200 terminates in step 240. Otherwise the process returns to step 226.

If the processor 122 determines in step 230 that the difference between any of the pairs of parameters exceeds the predefined threshold, then processing continues to step 232. At step 232 an adjustment to a user setting that would result in the sensed parameters to better approximate the recorded parameters is determined. At step 234 the adjustment may be implemented automatically, or implemented with a user action, for example user confirmation. In one implementation the duration the last setting is maintained is adjusted in a predetermined manner, for example by an amount proportional to the percentage the sensed parameter differs from the recorded parameter, or according to amounts in a look-up table.

For example, in a sequence for blending ingredients (using a blender or a heated blender), the blending motor speed ($v_1$) as well as the time duration for blending ($t_1$) are the user settings that have been recorded. In addition, the motor torque ($Nm_1$) as measured when the sequence was recorded forms part of the recorded parameters. When the sequence is played back, the blender is set to the recorded speed $v_1$, for duration $t_1$. The torque is measured ($Nm_2$), and this sensed parameter is compared to the recorded parameter $Nm_1$. the torque is an indication of the load on the motor, and therefore indicates characteristics of the ingredients that would influence the load, for example a higher load could indicate the use of more ingredients. In one example, the speed $v_2$ of the blender's motor is adjusted according to the difference in torque, $Nm=Nm_2-Nm_1$, which may also be described as a percentage % Nm. In another example the duration $t_2$ for blending is adjusted, and in yet another example both the speed $v_2$ and the duration $t_2$ are adjusted. These adjustments can be linearly proportional, or according to an appropriate profile (e.g. pulsing the blender). An example of a linear adjustment of the duration $t_2$ can be understood with reference to equation (1), where k is a constant:

$$t_2 = t_1 \cdot (1 + k \cdot (\% \Delta Nm)) \quad (1)$$

In its simplest form this can be described by the following example wherein the torque is measured anywhere during execution of the specific step, for example 1 second into blending. A blending step in a sequence is defined by the user settings of blending speed at $v_1=7,000$ rpm for a time interval of $t_1=10$ seconds, and the recorded torque parameter is $Nm_1=1.5$ Nm. During playback, the sensed torque parameter is $Nm_2=1.8$ Nm. In this example the constant k=1, so that % $Nm=(Nmi-Nm_1)/Nm_1=20\%$, therefore the playback time is adjusted as follows:

$$t_2 = 120\%(t_1) = 12 \text{ seconds} \quad (2)$$

for more accuracy, a running average of the torque may be measured and calculated, and the adjustment will then be calculated as the playback blending step proceeds. In this way changes to the characteristics of the ingredients will also be taken into consideration. For example, referring again to the above example, the torque $Nm_2$ may be measured at each second (or every 2 or 3 seconds), and the running average of the torque $Nm_2$ can then be calculated to provide an ongoing and more accurate indication of the changes required in user setting(s).

An example to illustrate the use of running averages will now be described, wherein the speed is adjusted according to a comparable relationship as shown in equation (1), where time is substituted for speed. Again, a speed of $v_1=7,000$ rpm is selected for $t_1=10$ seconds, and the torque $Nm_1$ is recorded per second over the IO second interval. On playback each recorded torque $Nm_1$ is compared to IO consecutive playback torque measurements $Nm_2$. The real time average of percentage difference is calculated as shown in Table I below. This results in an adjusted speed, $v_2$, labelled as "Option I $v_2$" in Table I.

in some embodiments the speed adjustment is not an ongoing calculation, but is determined within the first portion of a step, e.g. within the first 3-5 seconds, or e.g. within the first 30%-40% of a step. The adjusted speed $v_2$ achieved at the end of this shorter adjustment period is then maintained until the end of the step. This reduces the calculation required, and also reduces the wear on the motor caused by several incremental adjustments. An example is shown in Table I, where the adjusted target output speed is labelled as "Option 2 $v_2$".

TABLE 1

| $t_1$ (time) 10 seconds | V1 (speed) predefined | Nm1 (torque) target | Nm2 (torque) | 6 Nm = Nmz − Nm$_1$ measured | % 6 Nm = (Nmz − Nm$_1$)/ Nm$_1$ (example) | real time average % | Option 1 $v_2$ (continual adjustment) k = 1.0 $v_2 = v_1 \times (1 + \%6\ Nm) \times k$ | Option 2 $v_2$ (initial adjustment) k = 0.9 |
|---|---|---|---|---|---|---|---|---|
| 1 | 7,000 | 1.5 | 1.80 | 0.3 | 20.0% | 120.0% | 8400 | 7560 |
| 2 | 7,000 | 1.4 | 1.68 | 0.3 | 20.0% | 120.0% | 8400 | 7560 |
| 3 | 7,000 | 1.3 | 1.55 | 0.3 | 19.2% | 119.7% | 8382 | 7544 |
| 4 | 7,000 | 1.2 | 1.40 | 0.2 | 16.7% | 119.0% | 8328 | 7495 |
| 5 | 7,000 | 1.1 | 1.29 | 0.2 | 17.3% | 118.6% | 8304 | 7495 |
| 6 | 7,000 | 1.0 | 1.10 | 0.1 | 10.0% | 117.2% | 8204 | 7495 |
| 7 | 7,000 | 0.9 | 1.00 | 0.1 | 11.1% | 116.3% | 8143 | 7495 |
| 8 | 7,000 | 0.8 | 0.85 | 0.0 | 6.2% | 115.1% | 8055 | 7495 |
| 9 | 7,000 | 0.7 | 0.70 | 0.0 | 0.0% | 113.4% | 7937 | 7495 |
| 10 | 7,000 | 0.6 | 0.60 | 0.0 | 0.0% | 112.1% | 7844 | 7495 |

Specific examples of the manner in which the settings are adjusted are described below with reference to specific examples of kitchen appliances.

Referring again to FIG. 2, following step 234 processing proceeds to step 236, where the processor 122 determines whether all the settings in the sequence have been used in controlling the operation of the appliance. If all the settings in the sequence have been used, the process 200 terminates in step 240. Alternatively, the process returns to step 226 for execution of a following one or more steps of the recorded sequence.

4. Modifying Recordings

Recorded sequences can be modified by the user, at one or more of the following times:
1. The sequence may be modified, substantially in real-time, while the sequence is still being recorded.
2. The sequence may be modified after recording, but before saving the recording.
3. The recorded sequence may be modified after it has been saved.
4. The recorded sequence may also be modified during playback.

Modifying the sequence, substantially in real-time, while the sequence is still being recorded: In some embodiments, while a food preparation sequence is being recorded the recorded user settings and the recorded parameters are displayed. This recorded information may be displayed on the appliance display 132 and/or on the display 194 of a remote computing device 190 running a software application adapted to support the use and manipulation of recorded sequences. For ease of reference, the software application is referred to herein as a "recipe composer application".

the display(s) provide visual feedback about the recording process and the recorded information, for example in the form of graphs (or simplified 61Taphs, for example showing Smoothed filtered data points or sampled data points). Where the recorded sequence is displayed on both the appliance display 132 and the device display 194, the displays substantially mirror one another, and any modification to the recorded data made by the user will also be mirrored in both displays.

While the sequence is being recorded, the user is able to modify the recorded data either by entering modifying commands via the appliance user interface 130 or by entering modifying commands via the user interface of the remote computing device 190, using the recipe composer application. For example, where a graph of recorded data is displayed on a touchscreen style display 194 of the remote computing device 190, the user is able to drag and drop the recorded user settings in order to modify the user settings.

Figure 8A:
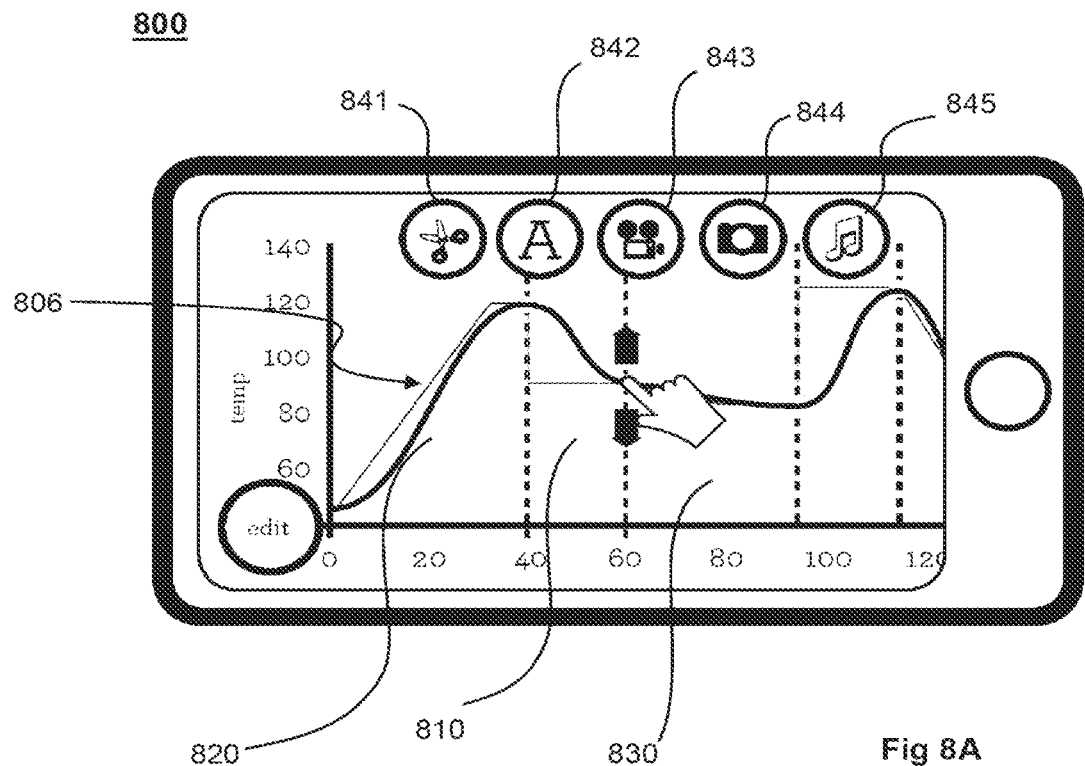
FIGS. 8A, 8B and 8C illustrate displays of a recipe composer application.
Figure 8B:
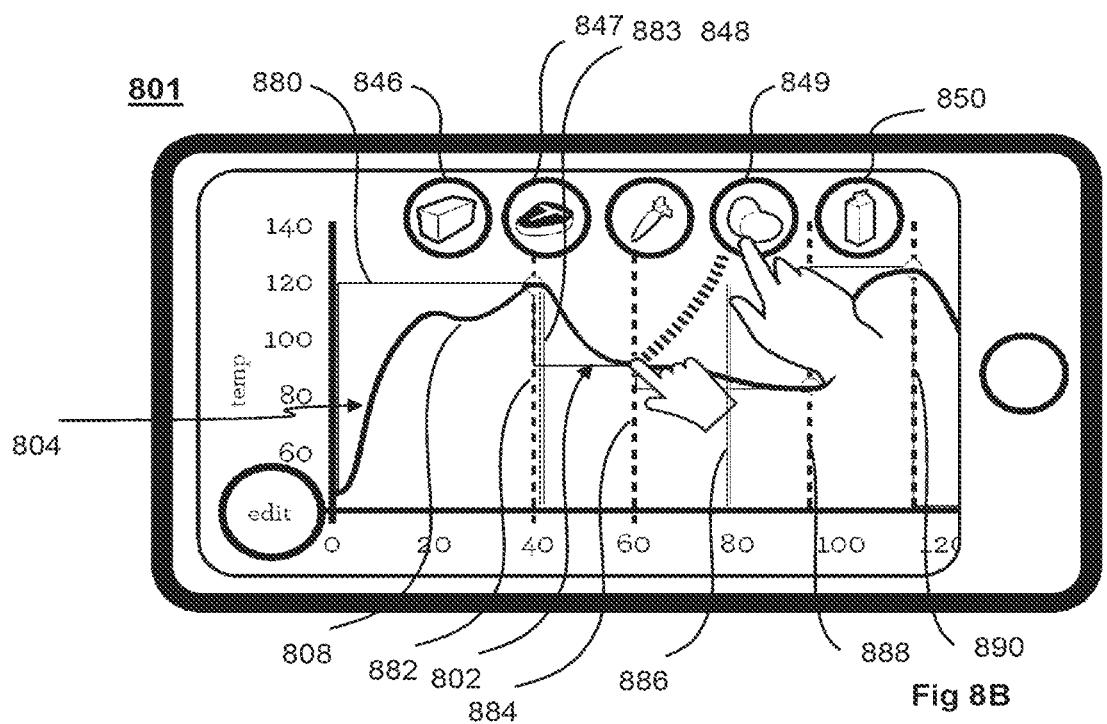

FIG. 8A and FIG. 8B are example application displays 800, 801 showing recorded data when viewed on a device display 194 running a recipe composer application. This particular example relates to a cooking process performed with an induction cooker. The user settings include temperature, time intervals and heating speed. Heating speed relates to how fast a certain set temperature is to be achieved, e.g. slow, medium, fast or maximum. In segment 806 the heating speed has been set to medium, and this is reflected in a linear increase in set temperature. In the other segments, the heating speed is set to maximum, so that the temperature user setting is indicated as a step input. Heating speed is described in more detail in International Patent Application WO 2012/006674 incorporated herein by reference.

FIG. 8A indicates a user modification of a user setting whereby the set temperature is altered to a higher or lower temperature when the end point 810 of a segment 820 is dragged up or down, respectively. End point 810 is also the start point of segment 830 that follows segment 820.

In the example of an induction cooker, if a user set temperature is 100 degrees, and the recorded data shows that the recorded temperature parameter only reaches 90 degrees (and never the intended 100 degrees), the user may, for example, drag the set temperature higher, or drag the recorded profile to increase the cooking time.

In some embodiments, such user modifications may be accompanied by a calculated extrapolation of recorded parameters, whereby a modification extending the cooking time (in the example of an induction cooker) may then be accompanied by an extrapolated temperature parameter to provide the user with feedback regarding an expected achieved temperature. The calculated extrapolation of recorded parameters is based on the known behavior of the specific appliance—either as pre-programmed, or as learnt during operation (e.g. with the use of a neural network or other suitable intelligence). Referring again to the induction cooker example, if the cooking time is modified to increase with 10%, and the extrapolated temperature parameter is then 100 degrees instead of the original 90 degrees, then the user has an approximate indication that the target temperature is more likely to be reached with the modified sequence than with the originally recorded sequence.

In addition to modifying user settings, the user is able to modify recorded sequences by adding annotations. FIG. 8A shows edit icons 841 to 845 that relate to multimedia and other annotation functions. In some embodiments dragging and dropping one or more of the icons shown, places a place-holder for a multimedia annotation on a certain point in the recorded sequence. The relevant multimedia can then be associated with the place-holder at a later stage. In other embodiments dragging and dropping an icon (such as the photograph icon 844) onto the recorded data activates a software application module whereby the specific multimedia is either created (e.g. activating a smartphone camera for taking a photo associated with the relevant preparation step in the sequence), or selected from a library as is known in the art.

it will be understood that any number of relevant types of annotation icons may be provided as would be relevant to recorded food preparation or cooking sequences, such as ingredient icons 846 to 850 as shown on the display 801 in FIG. 8B. In the example shown in FIG. 8B, an ingredient icon 849 (in this case the ingredient is indicated to be "eggs") is placed on a specific position of the recorded sequence, according with a certain time and/or temperature in the recorded sequence. This type of fast and easy modification can be done during the recording process, resulting in a recipe step "place-holder".

Modifying the sequence after recording, before saving the recording: In some embodiments the recorded sequence may be modified after recording, before saving the Recording. Once the end of a recording has been indicated by a user input or has been detected (refer to determining the passive state predefined time period as described elsewhere herein), the appliance (and/or the remote device 190 application, depending on the platform being used by the user) will provide the user with the option to modify the recording before saving the recording. At this time the same modifications can be made as described above with reference to modifications that can be made while recording is in process.

Additional modification options may also be available at this time (or may simply be easier to do post-recording). Referring again to the example described above with respect to FIG. 8B, following recording, when the user reviews the recorded sequence, the user can then refer back to the recipe step place-holder and add further details. For example, where the place-holder indicates the "eggs" ingredient, further details may include how many eggs to use and what to do with them at this point in the recipe. These details may be entered using the remote device 190 application, for example selecting an icon, other place-holder or position on a recording may call up a dialog box in which to enter written annotations. In some embodiments the remote device 190 application displays a conventional style recipe template (for example having an "ingredients" section and a "method" section), and annotations may be made within this template to accord with steps recorded in the sequence. This is described in more detail elsewhere herein with reference to FIG. 8C.

Modifying the recorded sequence after the sequence has been saved: After a recorded sequence has been saved, the user may at any time access the saved sequence (either via the appliance user interface 130 or via the remote device 190 application) and select a sequence modification mode whereby any of the user settings and/or annotations may be modified.

Modifying the Recorded Sequence During Playback:
Saved sequence modifications are also possible while a sequence is being played back. For example, if a blending sequence has been selected, and the user has decided to change the blending speed, this change is recorded and the user is provided with the option to save the change to the original sequence. In another example, where an adjustment to a user setting is determined by the appliance itself, such an adjustment may also be saved to the original Sequence. (See description elsewhere herein regarding playback adjustments where sensed parameters differ from recorded parameters).

it will be understood that any processing required for the modification of recorded sequences may be pardoned either by the processor 122 of the appliance or by a processor associated with the remote device 190, depending on the specific configuration of the system. Processing and memory functionality may be provided on one or both the appliance 100 and the remote device 190. In some embodiments recorded (and modified) sequences are saved on both the appliance 100 and on the remote device 190. In some embodiments recorded (and modified) sequences are saved on the remote device 190, and uploaded to the appliance 100 for playback. In some embodiments the appliance 100 may include limited memory (ROM 124), so that some recorded sequences may be saved on the appliance 100 itself (for example sequences that are used often), while other recorded sequences (or all recorded sequences) may be saved remotely on the device 190, to be accessed and uploaded to the appliance 100 when required.

for all of the sequence modifications possible, the modification may be saved in one or more different configurations. For example, the modified sequence may be saved as a replacement of the original sequence, whereby the original sequence is over-written and not saved. Alternatively the modified sequence may be saved in addition to the original sequence, as a new and separate sequence (for example accessible as a separate cooking recipe). In other embodiments, one or more modified sequences may be recorded and saved in sequence or recipe families, whereby the original sequence and modified sequences stemming from the original sequence are grouped together. This grouping enables a user to access and view family data together, for example to view alternative sequences associated with, e.g. alternative (but related) ingredients, portion sizes, <loneness preferences, etc.

5. Compiling Recipes from Recorded Sequences in some embodiments the recorded sequence may be automatically pre-processed by the processor 122 before saving, once the save option has been selected. For example, the recorded sequence may be split into "preparation stages" to identify steps, similar to conventional method steps of a recipe. By way of example, FIG. 8B shows a graphical display 801 of recorded user settings for temperature as well as a recorded temperature parameter Measured by a temperature sensor in contact with a cooking vessel used with an induction cooker. FIG. SC. shows an example of a prepopulated recipe template 860 as generated by the remote device's processor and displayed in the recipe composer application.

5.1 Recipe Auto Segmentation

Figure 8C:
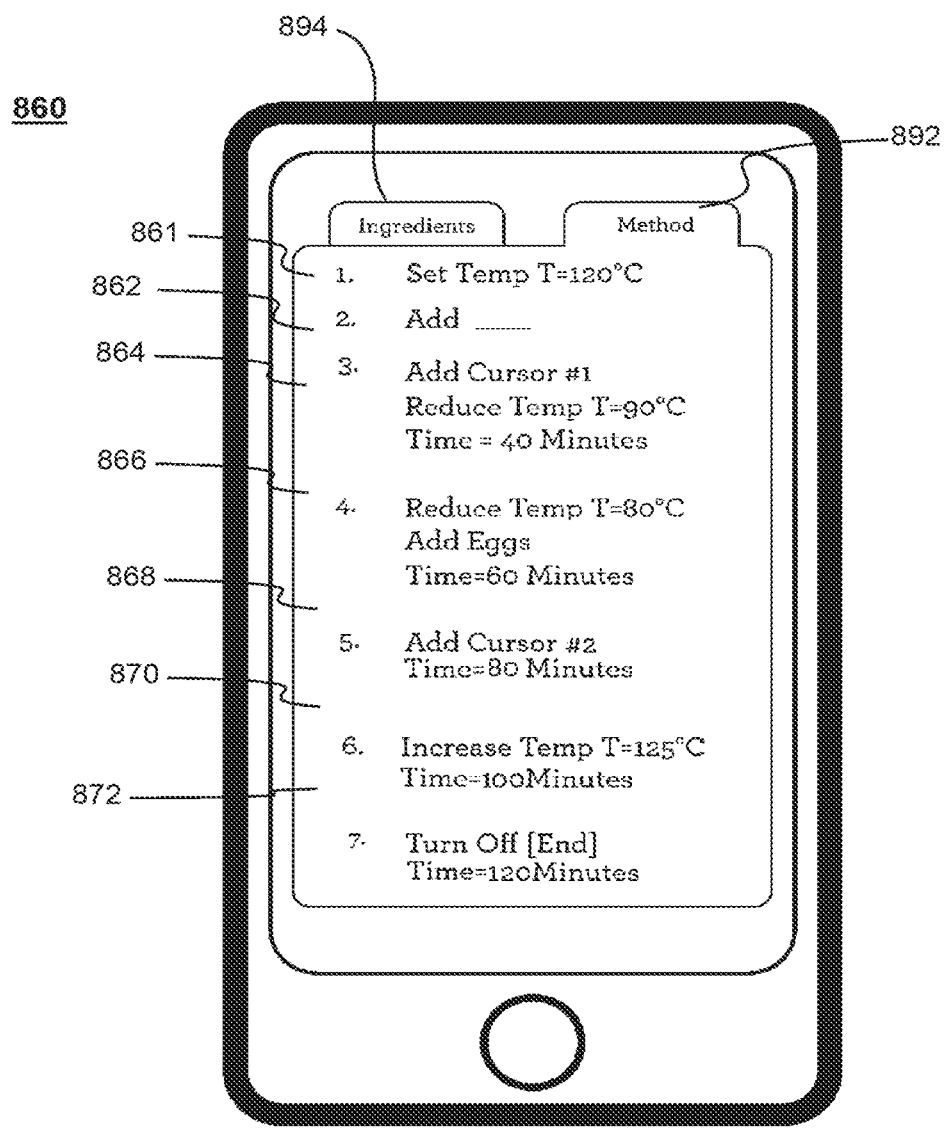

In the preferred implementation the variation over time of both (1) user settings (shown by the thin solid line 802), and of (2) one or more of the recorded parameters (shown by the thick curved line 804) are analyzed and segmented, with each segment being associated with a separate preparation stage (or "recipe step"). Automatically segmenting a recording in this way results in a recorded sequence comprising segments that can readily be converted to a representation that resembles a conventional recipe, i.e. a list of method steps associated with the preparation and/or cooking of ingredients. These separate steps resulting from the segmentation are presented to the user on the appliance display 132 and/or the remote device display 194 for editing prior to and/or after saving, allowing for example notes, such as "Set blender speed to 8" to be added to the start of one of the segments. This is illustrated in FIG. 8C. The notes are displayed to the user on the display 132, e.g. during subsequent replay.

The recorded sequence may be segmented at times corresponding to times where user settings have been changed, for example changes in temperature. A text note indicating the setting change may also automatically be added to the segment. For example, if the set temperature is changed to 90° C., a note, such as "Set temperature to 90° C." may be added to the segment. That note would be displayed on the display 132, 184 during replay of the recorded (and edited) sequence. Temperature changes are shown in FIG. 8B at point 882 where the temperature is set to 120 degrees, at point 884 where the temperature is reduced to 90 degrees, at point 886 where the temperature is changed to 80 degrees, at point 888 where the temperature is increased to 125 degrees, and at point 890 where the temperature is turned to zero. As described below in more detail with reference to FIG. 8C, each of these changes in user setting is used to generate a separate recipe step in the prepopulated recipe template 860.

Further, the recorded sequence may be segmented at times corresponding to unexpected significant changes (e.g. a 10% change or more) in the sensed parameter. For Example, a sudden drop in the sensed temperature while the set temperature has not changed (as shown at point 808 in FIG. 8B) may identify new (cold) ingredients being added to the food being prepared by the appliance 100. In that case, beyond merely segmenting the variation over time of the sensed temperature, the user may automatically be presented with an "add ingredients" option or menu, allowing the user to specify the ingredient that was added. This is shown in FIG. 8C at recipe step 2 862. Similarly, when the appliance is a blender, a sudden increase in the power used by the motor is an indication of an increased load on the motor, and therefore an indication of ingredients added into the blending jug. The power increase may be measured by, e.g. a current sensor.

5.2 Segment from Icon or Marker Placement

In the event that the remote computing device 190 is connected to the appliance 100, a recipe composer application executing on the remote computing device 190 may display one or more of the user settings and/or recorded parameters on the display 194 of the remote computing device in the form of one or more graphs. The remote computing device 190 is able to receive user inputs which place icons on the displayed graph(s). In some embodiments the remote computing device 190 then segments the displayed 6'Taph(s) at or around where icons are placed. The user is then able to edit the segment and attribute a separate preparation stage to each segment as desired. In FIG. 8B, for example, the egg ingredient icon 849 is placed on the graph of the recorded data at point 884 resulting in segmentation here. In this example, point 884 happens to also coincide with a change in temperature.

in some embodiments the graphical representation of the recorded sequence may be segmented by the user by the placement of markers or cursors at the start of segments that correspond to recipe method steps. For example, during the recording process a user may view a representation of the recording on the display 132 of the appliance 100, and place cursors via the appliance 100 user interface 130 such as cursor #1 883 and cursor #2 886 (shown in double lines). When the recorded sequence is saved, these marked positions may be used to automatically generate a text representation of the recorded sequence into "recipe steps", each step associated with a segment of the recorded sequence as shown following a particular marker. This is shown at recipe step 3 862 and recipe step 5 868 in FIG. 8C. Subsequently, the user may Access the recorded sequence via the recipe composer application on the remote device 190 to further amend and/or annotate the recorded sequence which is then displayed as a prepopulated conventional style recipe representation 860 as shown in FIG. 8C.

The example of a prepopulated recipe template 860 shown in FIG. 8C accords with the graphical display 80 1 of the recording, as modified by the user, shown in FIG. 8B. Seven method steps 861-872 are shown that have been automatically selected based on a combination of (1) changed user settings (in this case temperature settings), (2) icon placements (in this case the ingredients icon 849), (3) unexpected changes in measured parameters and (4) cursor placements (in this case cursor #1 882 and cursor #2 886).

Step 1 861 includes temperature information associated with the initial temperature setting of 120 degrees at time 0, shown at 880.

Step 2 862 corresponds to an unexpected drop in measured temperature ("unexpected" referring to a drop in measured parameter that does not accord with the user setting, namely a steady set temperature of 120 degrees 880). The text in the prepopulated recipe template at this point is simply a placeholder for adding further details regarding an added ingredient. (Note that this example relates to an induction cooker, where the sensed parameter is the temperature of the cooking vessel itself, described in more detail in International Patent Application WO 2012/006674 incorporated herein by reference).

Step 3 864 is associated with both the placement of cursor #1 at 882, and the temperature user setting that is changed, so that a recipe step inserted here includes text relating to both aspects.

Step 4 866 is associated with placement of the eggs icon 849.

Step 5 868 is associated with cursor #2 at 888. When the segmentation is performed, no details about this step are available yet, e.g. from a change in user settings, a change in recorded parameters, or icon placement. The recipe step 868 is therefore a place holder without specific text, ready for the user to finalize at a later stage.

Step 6 870 is associated with the change of temperature to 100 degrees at 888 shown in FIG. 8B.

Step 7 872 is the end of the recipe, associated with turning the temperature to zero at 890.

the prepopulated method steps generated through this automatic segmentation process are shown on a "method" tab 892 of the recipe shown in the recipe composer Application. In addition, there is an "ingredients" tab 894 which may be prepopulated by a list of ingredients based on ingredients icons that have been placed, such as the eggs icon 849 in this case.

in some embodiments a user may define the ingredients prior to recording so that predefined ingredient icons are made available for placement on a graphical representation of a recording.

5.3 Segment or Annotate According to Sensed Cooking Style

The remote computing device 190 may additionally analyses the segments and attribute a particular cooking style to one or more of the segments. In the preened implementation, a setting and the duration of that setting combination of each segment is compared with a look-up table in order to identify a cooking style to attribute to respective segments. For example, for an induction cooker a low temperature setting that is maintained for a long period is indicative of a "slow cooking" style. The remote computing device 190 then places icons representing the cooking style on the displayed graph(s) with the respective segments. The user is able to edit the segment and attribute a different cooking style or other relevant information (e.g. user actions or multimedia) to segments as desired.

for a blender the speed of the blade may be indicative of a certain food preparation style. For example, a slow blade speed may be used for "stirring" ingredients, whereas a faster blade speed may be used for "blending" ingredients. Therefore, upon determining a blade speed being within a certain range, the recorded sequence can be automatically annotated with a "stirring" or with a "blending" icon or method step.

where the blender includes a temperature sensor, a combination of blade speed and measured temperature may be used to identify a certain food processing function. For example, where a drop in temperature is measured, and the blender motor is pulsed, the recorded sequence may be annotated with an "ice crush" icon on a displayed graph or description in a written method.

5.4 Transitioning to a Next Segment in the preferred implementation, the default setting is for a current segment to tunicate, and a next segment to commence, when the duration of the segment has expired. However, other segment transition criteria may be set by the user.

For example, the segment transition criteria may include that transitioning to a next segment is to be delayed until a set temperature is reached. As described herein with reference to FIG. 2 (step 232), user settings are automatically adjusted in order for the sensed parameters to better approximate the recorded parameters. However, there are instances where it is important for certain sensed parameters to be reached, for example for water to reach boiling point, and even when maximum heating is applied, due to various possible reasons, the boiling point is not reached in the segment duration. In that even the self, 'IL lent transition criteria are advantageously set to include that transitioning to the next segment is to be delayed until the sensed temperature reaches 100°.

in another example the segment transition criteria may include a rate of change of a sensed parameter. This is useful since different types of food behave differently, and different temperatures are required at different atmospheric pressures (e.g. at different altitudes). For example, rate of temperature change may be used in determining the transition between segments. More specifically, the segment transition criteria using rate of temperature change may be set such that replay of a next segment only commences after the rate of temperature change of the current segment falls below 1 degree per second, for example.

Having described the kitchen appliance 100 generally, and the operations of the appliance 100 under control of the processor 122, examples of kitchen appliances and their implementation of process 200 are next described.

6. Appliance Example 1: Blender

Figure 3A:
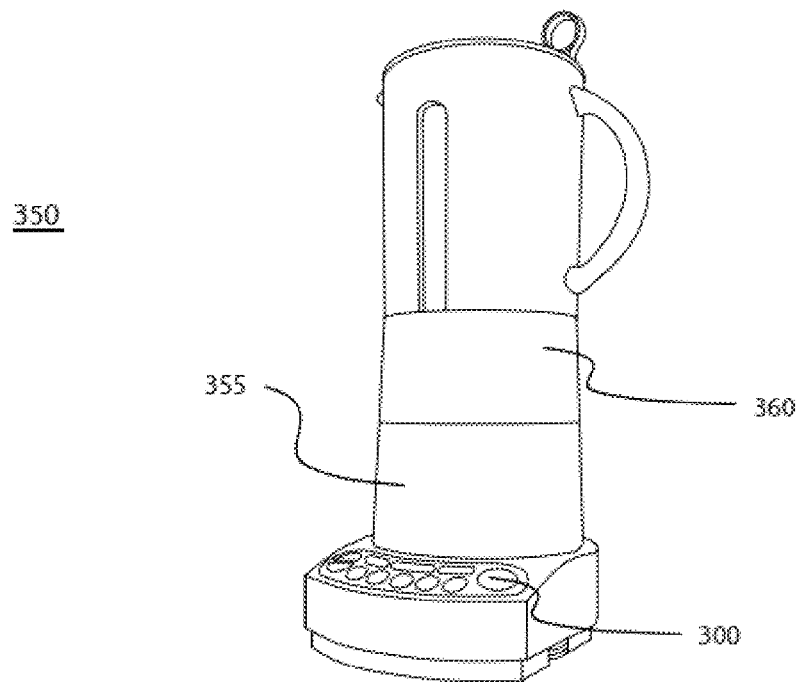
FIG. 3A shows a blender according to the present disclosure.

FIG. 3A shows a blender 350 according to the present disclosure. The blender 350 includes a base 355, which includes a motor (not shown) driving a shaft (not shown) which Extends from the base. The shaft couples to and drives a blade (not shown) carried by a removable pitcher.

Figure 3B:
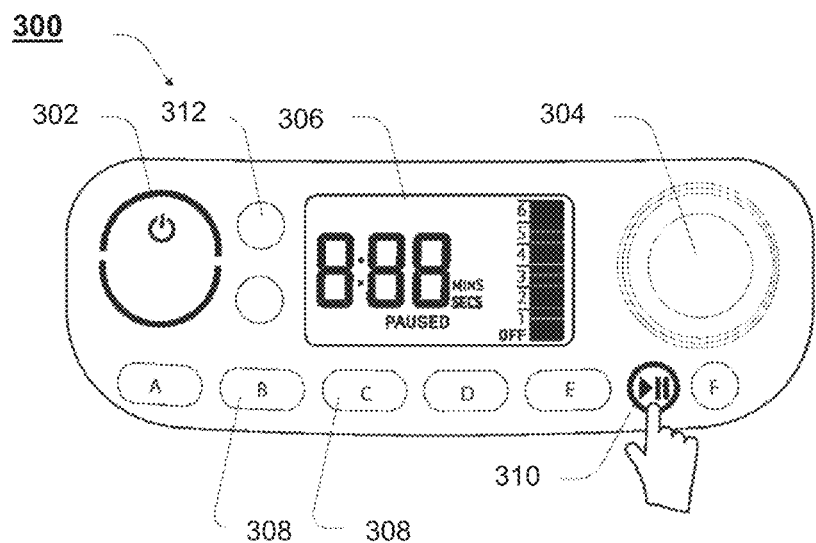
FIG. 3B shows a user interface of the blender shown in FIG. 3A.

FIG. 3B shows a user interface 300 of the blender 350 shown in FIG. 3A. The user interface 300 includes a power button 302, a display 306, a speed dial 304, and a number of function buttons 308, 310, and 312. In the preferred embodiment, the function buttons 310, 312 include a play/pause toggle button 310 for initiating playback of a recorded sequence, for pausing the playback of the recorded sequence, and then for resuming the playback of the recorded sequence. Function buttons 308 are user definable, allowing the user to assign a recorded sequence to a particular function button 308.

The blender 350 includes a "bit more" function, whereby upon completing one or more speed-time blending combinations, the last combination executed is referred to when a user selects the "bit more" function (either via a separate "bit more" button, or by using one or more buttons and/or dials to navigate the menu displayed on the user display). The "bit more" function then results in an additional blending step whereby the ingredients are blended at the speed of the last speed-time combination, but for less time than the time of the last combination. The less time may be, for example, either a predetermined duration (e.g. 5 seconds), or a percentage of the last combination's time (e.g. 10%).

the power interface 150 (FIG. 1) of the blender controls the amount of power supplied to the motor, and thus controls the rotational speed of the blade. A speed sensor (not shown) is also provided to sense the speed of the shaft, allowing the processor 122 to control the speed of the shaft more accurately.

After the blender 350 is powered up by depressing of the power button 302, and upon receipt of a first user setting, for example by the speed dial 304 being turned, the user settings and shaft speed are recorded as a sequence into the RAM 128, while the power interface 150 is controlled to effect the user settings as appropriate. The user may adjust the set speed by rotating the speed button or dial 304.

After the blending sequence has ended, indicated by the shaft having been stationary for a predefined time period the processor 122 controls the display 306 to prompt the user with a message questioning the user whether the recorded sequence is to be saved for future replay. Alternatively, an "Edit and Save" function button 312 may be depressed following which the user is provided with options including saving of the recording sequence for future replay. The user may depress one of the user definable buttons 308, causing the recorded sequence to be assigned to that button 308.

Later, when the blender 350 is in the playback mode, and that user definable button 308 is depressed, followed by the play/pause toggle button 310, the processor 122 of the blender 350 controls the power interface 150 to control the motor to replicate the recorded sequence until the sequence is completed. During the replay of the recorded sequence, the processor 122 determines the difference between the recorded shaft speed and the sensed shaft speed. If the processor 122 determines that the difference between the recorded shaft speed and the sensed shaft speed exceeds a predefined threshold, then the duration the set speed is maintained is adjusted, for example by an amount inversely proportional to the percentage the sensed shaft speed differs from the recorded speed. Accordingly, if the sensed shaft speed is lower than the recorded shaft speed, the duration that speed setting is maintained is increased.

a difference between the recorded shaft speed and the sensed shaft speed typically indicates that the ingredients have been altered from those used during the recording of the sequence. For example, the amount of liquid may have been altered, or the fruit used in the blended 350 are less ripe than those used during the recording of the sequence. The benefit of adjusting the duration the speed setting is maintained in response to detecting a difference between the recorded shaft speed and the sensed shaft speed is that the amount the ingredients would be blended better approximates that amount achieved during the recording of the sequence. Where a recorded sequence has been adapted during playback, the user is provided with the option to save the adapted user settings and sensed parameters in addition to the original user settings and recorded parameters (or to overwrite the original user settings and recorded parameters with these adapted user settings and sensed parameters). Being able to record modified playback features in this way is possible for all the appliances described herein where Recorded sequences are played back and modified (manually and/or automatically) during playback.

if the user, after playback of a recorded sequence, selects the "bit more" function, the user is then provided with the option of appending this additional step to the recorded and saved sequence. This is the case for all appliances that include "bit more" functionality (as described below with reference to each appliance).

as explained, the recorded sequence can be modified during playback. The sequence can be modified manually by the user, either by a simple selection of the "bit more" function, or by other user inputs such as changing the blending speed, profile or the blending time. The sequence can also be modified automatically, as described above, where the recorded and sensed parameters differ. In some embodiments, playback sequence modifications are saved automatically or the option is provided for the user to select. In some embodiments these saved modifications overwrite the original saved sequence. In other embodiments these saved modifications are saved in addition to the original saved sequence. In some of these embodiments, the modified sequences are saved in a manner associating them with the original saved sequence so that a user can, upon playback, select the specific version of a recorded sequence to be played back: i.e. the original version or the modified version. In some embodiments, a plurality of sequence versions can be associated with a sequence group (or a "recipe group"), and these groups can be accessed and managed via the appliance interface and/or via the recipe composer application available on the computing device 190. Saving recorded sequence modifications and the ability to create sequence groups as described here is a feature of all the appliances described herein.

7. Appliance Example 2: Heated Blender

Figure 4A:
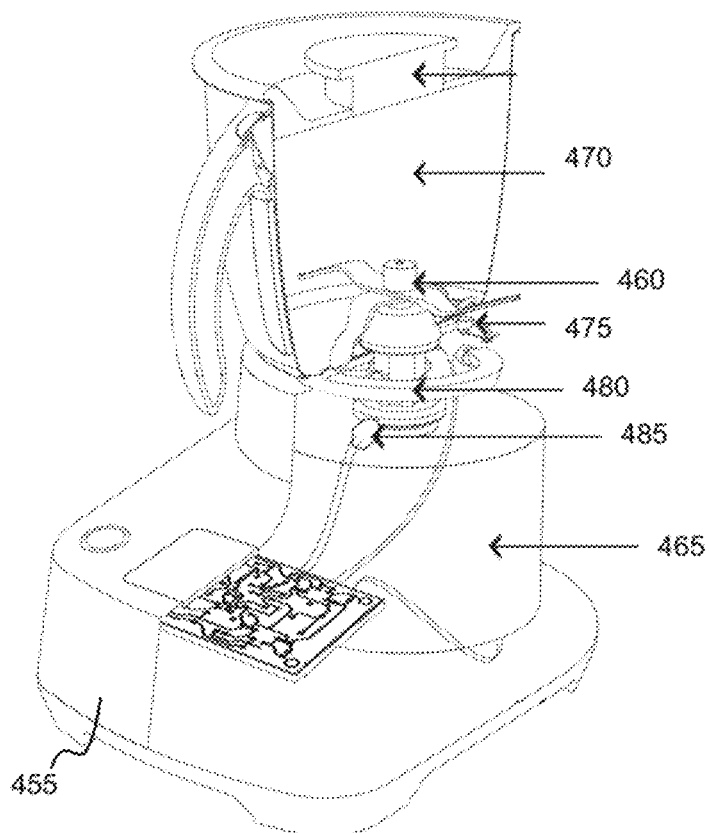
FIG. 4A shows a heated blender according to the present disclosure.

FIG. 4A shows a sectional view of a heated blender 450. The heated blender 450 includes a base 455, which includes a motor 465 driving a shaft (not shown) which extends from the base 455. The shaft couples to and drives a blade 460 carried by a removable cooking vessel 470. The base 455 or removable cooking vessel 470 further includes a heater element 480 for heating the contents of the cooking vessel 470.

Figure 4B:
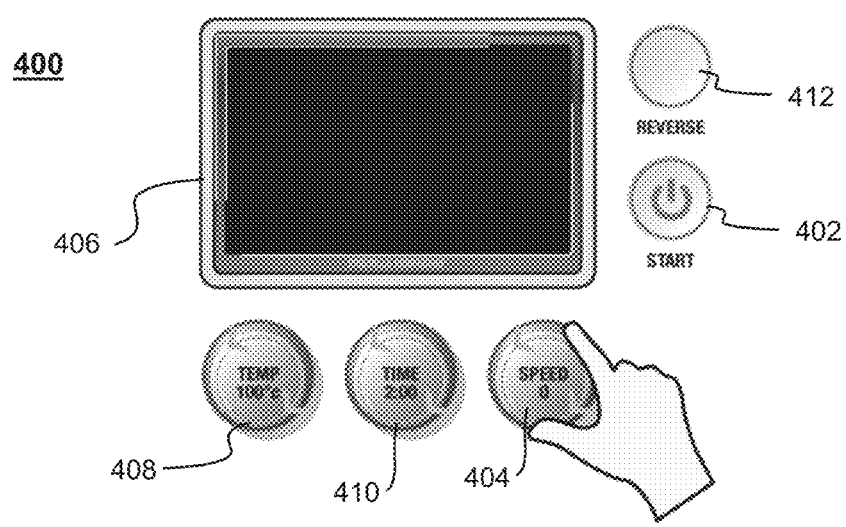
FIG. 4B shows a user interface of the heated blender shown in FIG. 4A, and FIGS. 4C to 4E show the user interface of FIG. 4B with various menu options displayed on the display.

FIG. 4B shows a user interface 400 of the heated blender 450 shown in FIG. 4A. The user interface 400 includes a power/start button 402, a reverse button 412, a display 406, a speed dial 404, a temperature dial 408, and a time dial 410. The speed dial 404 allows for the rotational speed of the blade 460 to be adjusted. Depressing of the reverse button 412 reverses the rotational direction of the motor 465, and hence the blade 460, without changing the speed.

The heated blender 450 includes a "bit more" function, whereby upon completing one or more speed-heat-time blending combinations, the last combination executed is referred to when a user selects the "bit more" function (either via a separate "bit more" button, or by using one or more buttons and/or dials to navigate the menu displayed on the user display). The "bit more" function then results in an additional blending and/or heating step whereby the ingredients are blended and/or heated at the speed/temperature of the last speed-heat-time combination, but for less time than the time of the last combination. The less time is either a predetermined duration (e.g. 10 seconds), or a percentage of the last combination's time (e.g. 15%).

the power interface 150 (FIG. 1) of the heated blender controls the amount of power supplied to the motor 465 and heater element 480 respectively. A speed sensor 485 is also provided to sense the speed of the shaft, allowing the processor 122 to control the speed of the shaft. A temperature sensor 475 is provided to sense the temperature of the contents of the cooking vessel 470, allowing the processor 122 to control the temperature within the cooking vessel 470. A torque sensor is also used (not shown), and can be supplemented or replaced by one or more other sensors that provide measurements that may be used as an indication of what the load on the blending/mixing blade is, e.g. current, power, weight or noise sensors.

Recording of the user settings received from dials 404, 408 and 410 and the reverse button 412, the shaft speed and cooking vessel temperature is started upon receipt of the first user setting that initiates operation of the blender 450 following the heated blender 450 being switched on. Responsive to the user settings the power interface 150 is controlled as appropriate to effect the user settings. During use the user may adjust the set speed by rotating the speed dial 404, adjust the set temperature by adjusting the temperature dial 408, adjust the cooking time by adjusting the time dial 410, and reverse the direction of rotation of the shaft by depressing the reverse button 412.

Figure 4C:
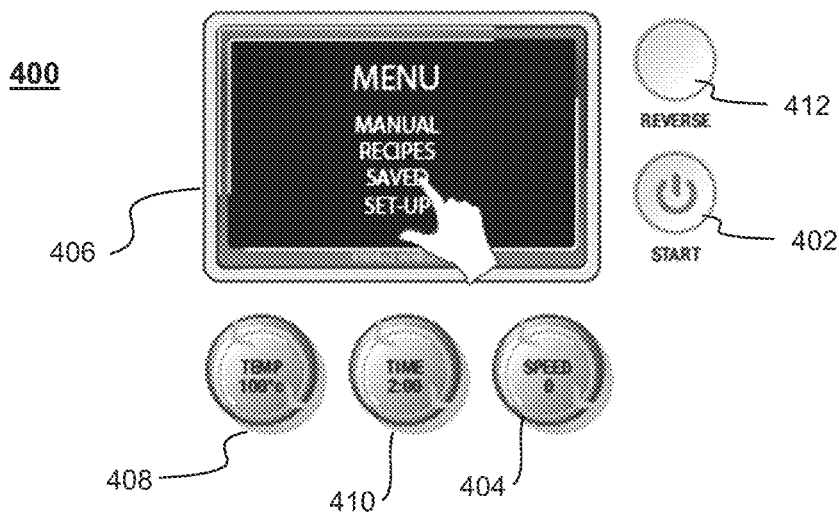
Figure 4D:
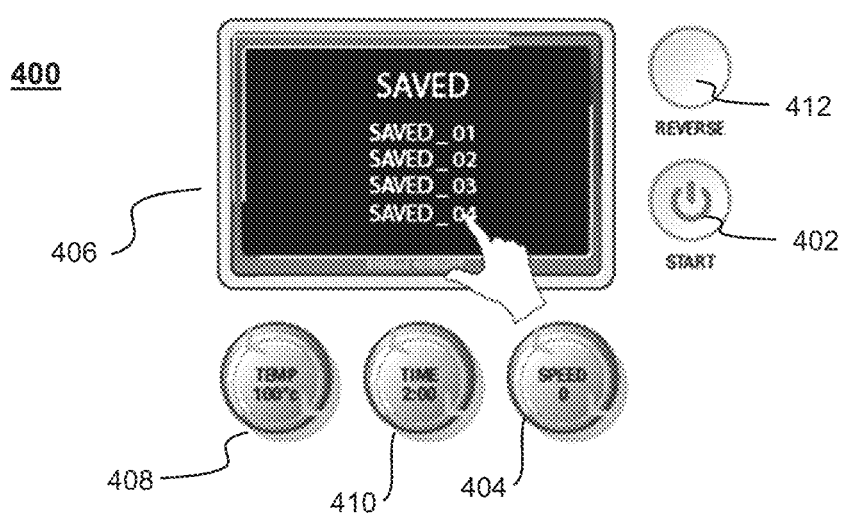
Figure 4E:
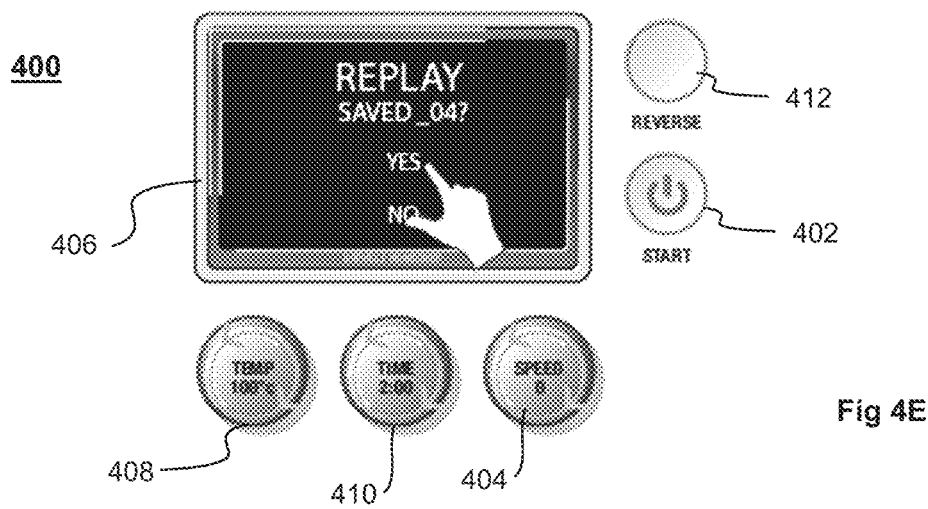

After the blending/cooking sequence has ended, indicated by the shaft having been stationary for a predefined time period as well as power to the heater element 480 being switch off for that predefined time period, the processor 122 controls the display 406 to prompt the user with a message providing the user with options, e.g. whether the recorded sequence is to be saved for future replay, is to be edited, or whether recording should continue. Alternatively, an "Edit and Save" function button may be depressed following which the user is provided with those options. The user may scroll through a list of unique identifiers, for example by rotating one or more of the dials 404, 408 and 410 to select an identifier to be asci$_6$'lled to the recorded Sequence, and causing the recorded sequence to be assigned to that identifier.

later, the recorded sequence may be replayed. FIGS. 4C to 4E show the user interface of FIG. 4B with various menu options displayed on the display 406. The menu options displayed on the display 406 shown in FIG. 4C include a "Saved" option which is to be selected when the user wishes to replay a recorded sequence. The menu options displayed on the display 406 shown in FIG. 4O include a list of saved sequences, each with a unique identifier. After the user selects one of the recorded sequences, the user is prompted, as is shown in FIG. 4E, whether the selected sequence is to be replayed. The processor 122 controls the power interface 150 to control the shaft speed and the cooking vessel temperature to replicate the recorded sequence until the sequence is completed.

During the replay of the recorded sequence, the processor 122 determines the difference between the recorded shaft speed and the sensed shaft speed, as well as the recorded cooking vessel temperature and the sensed cooking vessel temperature (or ingredient temperature, depending on the configuration of the temperature sensors). If the processor 122 determines that the difference between the recorded shaft speed and the sensed shaft speed exceeds a predefined threshold an adjustment is determined, for example in a manner similar to the example described in relation to FIG. 2. If the difference between the recorded cooking vessel temperature and the sensed temperature exceeds another predefined threshold then an adjustment to a user setting that would result in the sensed parameters to better approximate the recorded parameters is determined, for example increasing the set temperature by the same amount that the recorded and sensed temperatures differ.

8. Appliance Example 3: Induction Cooker

Figure 5A:
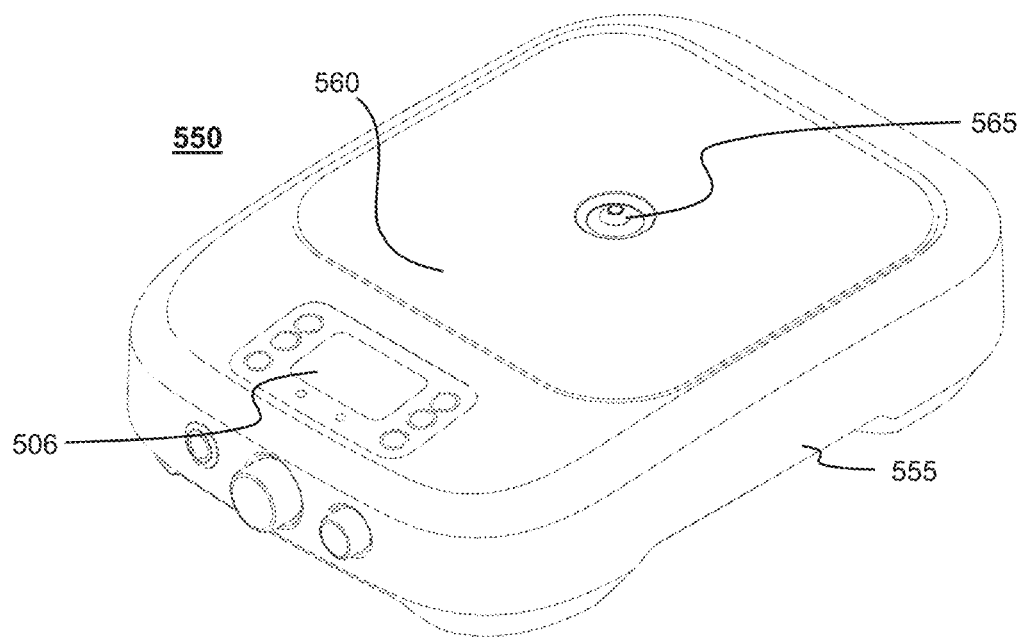
FIG. 5A shows an induction cooker according to the present disclosure.

FIG. 5A shows an induction cooker 550. The induction cooker 550 includes a portable base 555, and an induction coil (not shown) for inducing a magnetic flux in the ferrous pot placed on a cooker top 560 of the induction cooker 550. The cooker top 560 includes a temperature sensor 565 which contacts the ferrous pot when placed on the cooker top 560 of the induction cooker 550. A temperature probe (not shown) having a temperature sensor may also be provided. The temperature probe may be inserted into the contents of the pot in order to sense the temperature of the contents.

Figure 5B:
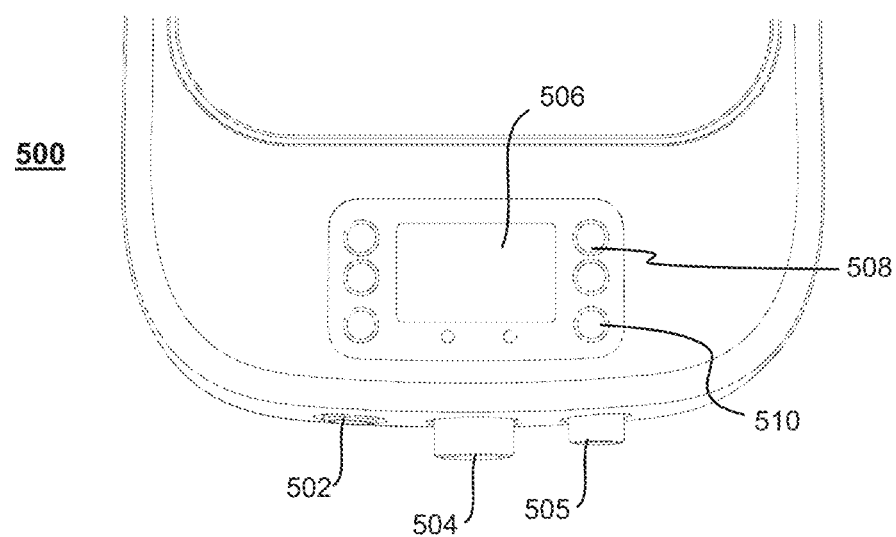
FIG. 5B shows a user interface of the induction cooker shown in FIG. 5A.

FIG. 5B shows a user interface 500 of the induction cooker 550 shown in FIG. 5A. The user interface 500 includes a power button 502, single- or multi-function dials 504, 505, a number of multi-function buttons 508, a stop/start button 510 and a display 506. At least some of the single- or multi-function dials 504, 505 and multi-function buttons 508 are used to navigate a menu-based user interface displayed on the display 506. The display 506 is also used to display current operating parameters, and may also be used to display a simplified graph indicative of the recorded information during the recording process described below.

the user interface 500 allows for the temperature of the ferrous pot to be set. In the event that the temperature probe is connected, the temperature of the contents of the pot is set using the user interface 500. The power interface 150 (FIG. 1) of the induction cooker 550 Controls the amount of power supplied the induction coil, and hence the amount of heat generated by the base of the ferrous pot. Using temperature data received from the temperature sensor 565 and/or the temperature probe, the processor 122 controls the operation of the induction coil, thereby changing the temperature of the pot. The rate at which changes in the set temperature are effected may also be user defined. For example, by setting the rate as "fast", maximum power would be applied when a higher temperature is set, thereby reaching the set temperature after a minimum lapsed time. Similarly, by setting the rate as "slow", the power applied to the coils would be increased gradually when a higher temperature is set, thereby reaching the set temperature after a much longer lapsed time.

when operation is initiated the user settings and sensed parameters are recorded as a sequence into the RAM 128. The user settings are received from dials 504 and 505 and buttons 508. The measured parameters include the pot and/or contents temperature, power applied to the coil (i.e. current and electric potential), and time (either the time that the set temperature is to be maintained once reached, or the time following the set of a new temperature which includes the temperature ramp up/down time).

The induction cooker 550 includes a "bit more" function, whereby upon completing one or more heat-time combinations (regardless of a heating speed being set or not), the last combination executed is referred to when a user selects the "bit more" function (either via a separate "bit more" button, or by using one or more buttons and/or dials to navigate the menu displayed on the user display). The "bit more" function then results in an additional heating step whereby the ingredients are heated at the final temperature of the last heat-time combination, but for less time than the time of the last combination. The less time is either a predetermined duration (e.g. 1 minute), or a percentage of the last combination's time (e.g. 5-10%).

Recording of the user settings and sensed parameters is started upon receipt of the first user setting following the induction cooker being switched on. Responsive to the user settings the power interface 150 is controlled as appropriate to effect the user settings.

After the cooking sequence has ended, indicated by the power to the coil having been switched off for a predefined time period, the processor 122 controls the display 506 to provide options including: 1) saving the recorded sequence, 2) carry on recording the sequence (since the sequence is not finished yet), 3) edit the recorded sequence before saving the edited sequence, etc. If the user chooses to save the recorded sequence, the user may scroll through a list of unique identifiers, for example by rotating one or more of the dials 504, 505 to select an identifier to be assigned to the recorded sequence, and causing the recorded sequence to be assigned to that identifier. In some embodiments the identifier is assigned automatically.

Later, when the induction cooker replays a recorded sequence, and that identifier is selected again by rotating one or more of the dials 504, 505, followed by the stop/start button 510, the processor 122 controls the display 506 to display instructions to the user, and also the power interface 150 to control the induction coil and thereby the temperature to replicate the recorded sequence until the sequence is completed.

during the replay of the recorded sequence, the processor 122 determines the difference between the recorded temperature and the sensed temperature. If the processor 122 determines that the difference between the recorded temperature and the sensed temperature exceeds a predefined threshold then the user settings are adjusted to at least reduce the difference, for example by altering the power applied to the coil thereby speeding up or slowing down the rate at which the pot is heated, or changing the time a set temperature is maintained.

9. Appliance Example 4: Espresso Machine

Figure 6A:
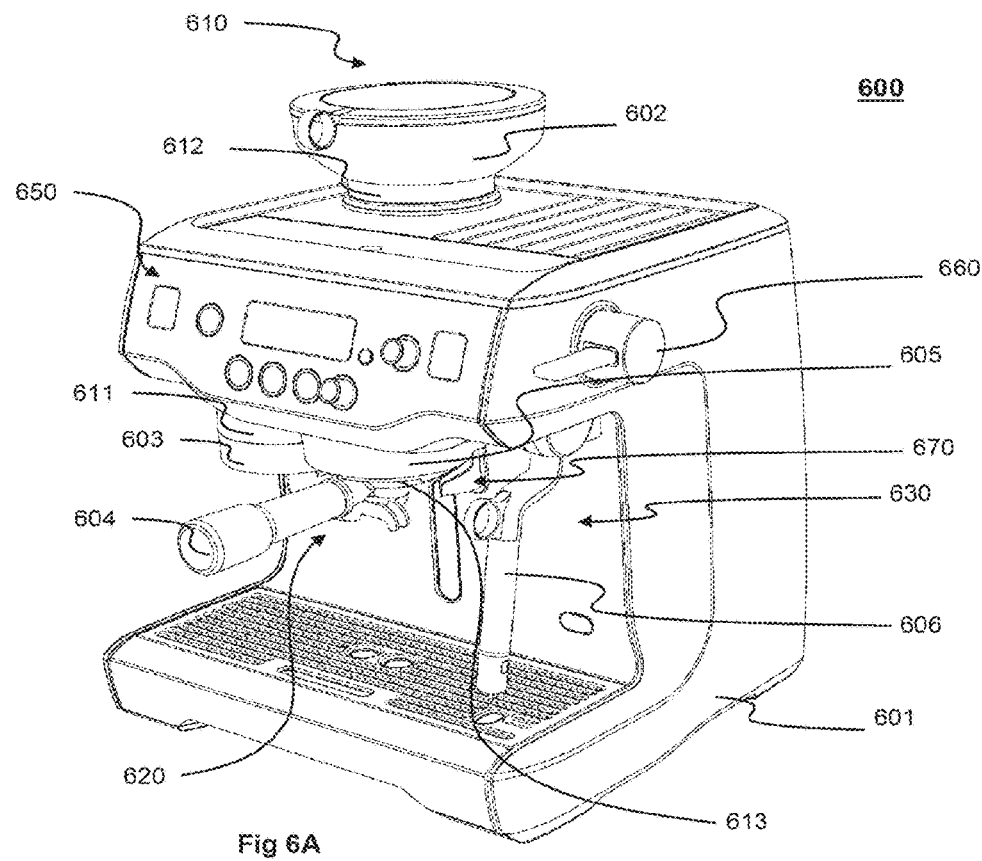
FIG. 6A shows an espresso machine according to the present disclosure.

FIG. 6A shows an espresso machine 600. The espresso machine 600 includes a base 60 1 which supports three separate functional parts, those being a built-in coffee grinder part 610 on the appliance's right, an espresso part 620 in the middle and a milk frother 630 on the left. Various features of such an espresso machine are described in international Application WO 2014/165905, incorporated herein by reference.

The built-in coffee grinder part 610 has a coffee bean hopper 602, a coffee grinder 612 below the hopper 602 and tamper 611 internal to a support cradle 603 that receives a porta filter 604 in order for the porta filter 604 to be filled with ground coffee beans which are then tamped in situ. The coffee 61"finder 612 has an associated motor (not shown) for controlling the separation of burrs of the grinder, which in turn controls the coarseness of the ground coffee beans. The coffee grinder also has a further motor (not shown) and associated gear system (not shown) for rotating the burrs (not shown) which grind coffee beans supplied from the coffee hopper 602. The amount of ground coffee beans dispensed into the porta filter 604 is controlled by controlling the duration the motor rotating the burrs is driven. Both motors are under control of the processor 122 (FIG. 1).

The tamper 611 also has an associated motor (not shown) and gear system (not shown) which, after the ground coffee beans are dispensed into the porta filter 604, applies a set force to the tamper to tamp the ground coffee beans. The force applied to the tamper is measured by a pressure sensor (not shown).

The espresso part 620 of the espresso machine 600 includes a brew head 605, a support cradle 613 for receiving the porta filter 604, a water tank (not shown) for storing fresh cold water, a boiler (not shown) for heating and pressurizing the water, and an auxiliary outlet 670 for dispensing hot water independent of the group head. The espresso paid 620 also includes at least one pump (not shown) for pumping water from the water tank to the boiler, and sensors (not shown) for measuring the temperature and pressure of water released from the brew head 605 into the porta filter 604.

The milk frother 630 of the espresso machine 600 includes a steam wand 606, a boiler (not shown) for heating water supplied from the water tank to create steam, a pump (not shown) for pumping water from the water tank to the boiler, an air pump (not shown) for injecting air into the steam path, and sensors (not shown) for measuring the temperature of milk into which the steam wand 606 is placed and the pressure of the air/steam mixture.

One or more of the operations of the espresso machine 600, the milk brother's steam wand, and the grinder may include a "bit more" function whereby a preceding operation can be extended upon. For example, during or following a 25 second coffee extraction, selection of the "bit more" function will add an additional 5 seconds of extraction time. Similarly, selection of the "bit more" function on the milk frother will add an additional 5-10% frothing time (if the operational metric fed back to the control system is time) or 3-4 degrees to the final temperature (if the operational metric fed back to the control system is temperature). As described with respect to other appliance examples elsewhere herein, the user is provided with the option of appending the "bit more" step to a recorded sequence, which can then be saved and played back in the original and/or modified version.

Figure 6B:
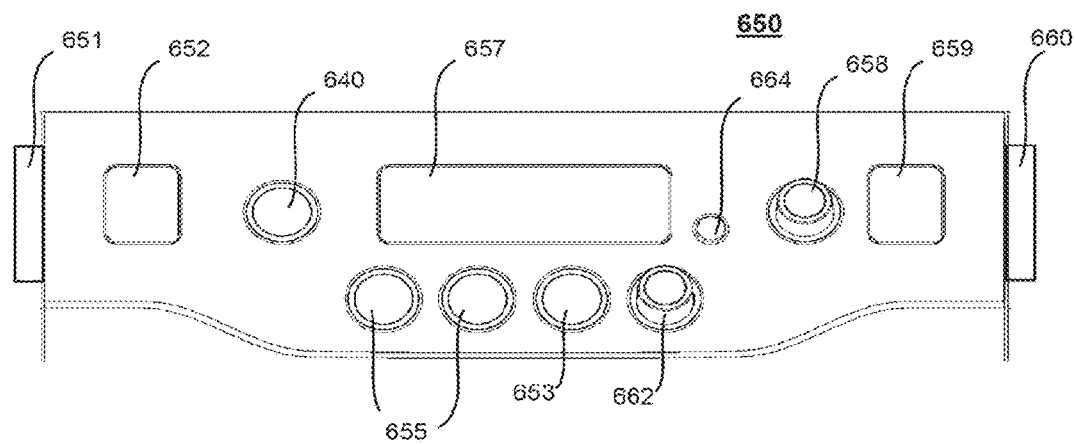
FIG. 6B shows a user interface of the espresso machine shown in FIG. 6A.

FIG. 6B shows the user interface 650 of the espresso machine 600 in more detail. The power button 640 turns the machine on following which an initialization process commences, during which various components of the machine are heated in preparation for coffee making.

The user interface 650 includes a grind controller 651 and a grind control display 652. The grind controller 651 allows a user to adjust the size of the coffee grinds and the amount of coffee grinds dispensed into the porta filter 604, while the grind control display 652 displays the user settings. Operation of the coffee grinder part 610 is controlled by the processor 122, and commences when a micro switch (not shown) inside the support cradle 603 is activated when the porta filter 604 is placed in the cradle 603.

The user interface 650 further includes controls 655 for setting the size of the coffee (one shot, two shots, or manual control), and hence the amount of water that would be dispensed by the brew head 605. Button 653 is used for pouring hot water, while button 662 is used for pouring a long black: a combined operation whereby an espresso shot is poured followed by a measure of hot water. A brew display 657 is provided for displaying the user settings of the espresso part 620 of the espresso machine 600.

For controlling the milk frother 630 the user interface 650 further includes a temperature/texture set knob 658 for setting the temperature of the frothed milk as well as the texture of the frothed milk, a froth display 659 for displaying the froth temperature and texture settings, and a froth activation lever/switch 660 which, when activated, causes the processor 122 (FIG. 1) to control the milk frother 630 of the espresso machine 600 to produce frothed milk according to the settings.

Button 664 is used to activate additional menu options, displayed on display 657 and navigated by one or more of the multi-function dials 651, 662, 658 and/or buttons 655, 653. These menu options may be used to set a number of operational parameters, such as the tamp force, the milk type used (and therefore the temperature and air pressure used in the frother 630), the water temperature used for extraction which is set at 92 degrees in a default setting, and the water pump pressure profile (pressure level and duration) used for extraction. Any one or more of these settings may be set for a single use, after which operation of the machine returns to default settings. Alternatively, the settings may be saved as the default settings.

In some embodiments, a coffee profile (including e.g. grind settings, brew settings, and/or frothing settings) may be recorded during operation of the coffee machine, after which the user is provided with the option of editing and/or saving the coffee profile for future use. In some embodiments two or more coffee profiles may be recorded and saved in this manner.

when operation is initiated the user settings and sensed parameters are recorded as a sequence into the RAM 128. The user settings include the size of the coffee grinds, the amount of coffee grinds dispensed into the porta filter 604 and/or the tamped force applied to the grinds in the porta filter 604, the amount of water dispensed by the brew head 605, the temperature of the frothed milk and the texture of the frothed milk. The sensed parameters include one or more of the following: the grinder 610 includes a torque sensor attached to the tamper that provides feedback on how full the filter basket is and how densely the grinds have been tamped; the brew path includes a number of temperature sensors (including an NTC sensor in the brew head 605) as well as one or more pressure sensors; the frother 630 includes temperature sensors in the steam wand 606 and pressure sensors in the steam path for monitoring and controlling the amount of air injected into the milk for frothing.

as is known with espresso machines, operation generally relies on default settings that are saved and then set again for operation upon startup of the machine. The espresso machine described herein, includes a recording feature whereby changes to the machine settings can be recorded so that one or more different profiles can be saved and accessed at a later stage. In some embodiments recording of the user settings is started upon modification of the first user setting following the espresso machine 600 being switched on.

in other embodiments recording does not necessarily start as soon as a setting is modified. Rather, once an operation is initiated, the processor 122 compares the user settings used for the operation with the previously used user settings that were referenced and loaded at startup of the machine 600. If there is a difference, then recording commences after this comparison returns a detected modification and when operation of the actual function (e.g. frothing or grinding) commences. The relevant sensor readings are also recorded during operation when a user setting modification has been detected. In some embodiments the operation of each separate functional part is recorded, saved and accessed for playback separately (i.e. for the grinder part 610, espresso part 620 and the frother 630). In other embodiments, as these operations are generally performed sequentially, the user settings and stored parameters are recorded and subsequently saved as a sequence.

After the operation has ended, and if the user chooses to save the recorded sequence, the user may scroll through a list of unique identifiers, to select an identifier to be assigned to the recorded sequence, and causing the recorded sequence to be assigned to that identifier. In some embodiments the identifier is assigned automatically.

Later, during replay of the recorded sequence, the processor 122 determines the differences between recorded and sensed torque (for the grinder part 610), temperature(s) and/or pressure(s) (for the espresso part 620 and the frother 630), and uses these differences to determine one or more adjustments to user settings that would result in the sensed parameters to better approximate the recorded parameters. For example, a lower sensed torque may be an indication of a different kind of coffee bean being used that results in less grind in the filter. When a lower torque is sensed, the grinder part 610 can then suggest to the user (requiring user selection or combination), or automatically implement, one or more small increments in grinding time and/or grind coarseness until the sensed torque is within a predefined range of the recorded torque, e.g. within 5%.

An example of adjustments to user settings following a comparison between recorded parameters and sensed parameters is in a coffee machine that includes a pre-infusion stage in the operation of the espresso part 620. If a high pressure or low flow rate is sensed during pre-infusion, it is an indication that there is a likelihood that the infusion stage may not function properly. This is because the coarseness of the grind, the amount of coffee, and/or the amount of tamping needs adjustment. The reason for this may be, for example, a different kind of coffee bean being used. In this example, following a pre-infusion with a flow rate or pressure difference between sensed and recorded parameters of, e.g. more than 5-10%, operation may be paused and the user provided with a message suggesting one or more adjustment options and an infusion restart.

10. Appliance Example 5: Compact Oven

Figure 7A:
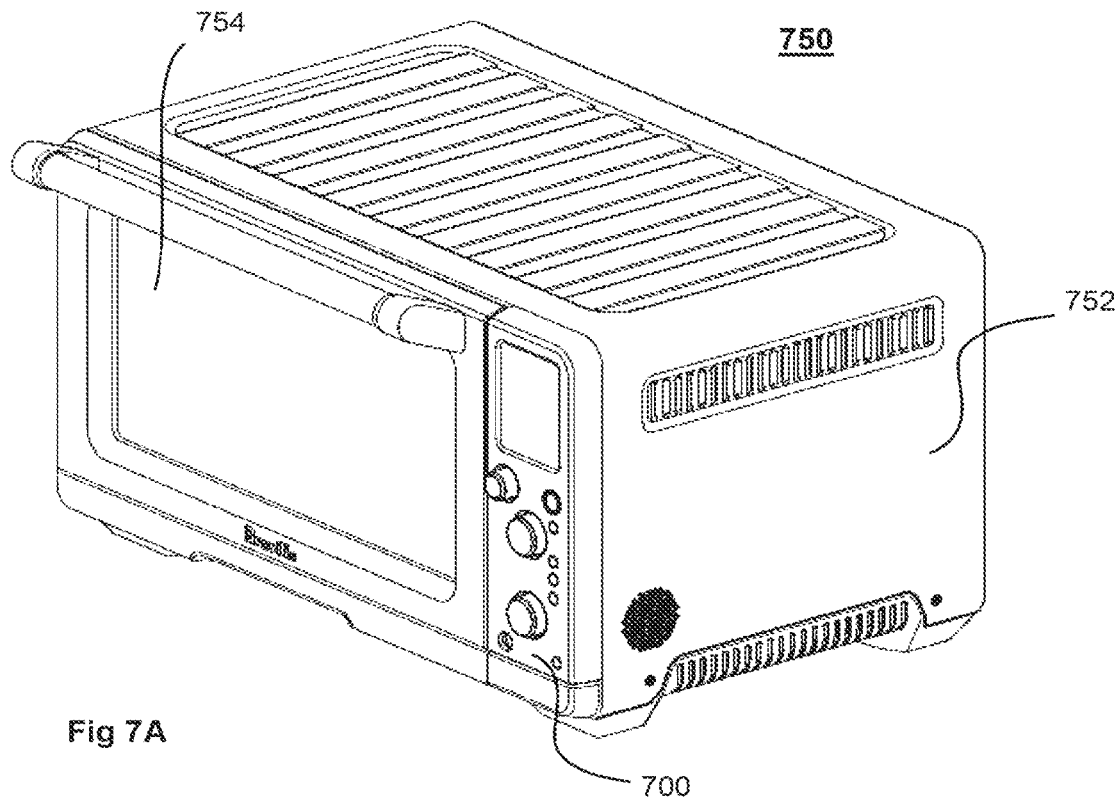
FIG. 7A shows a compact oven according to the present disclosure.

FIG. 7A shows a countertop compact oven 750 according to the present disclosure. The compact oven 750 has a thermally insulated housing 752 that defines an internal heating compartment closed by door 754. The heating compartment has opposing pairs of fixtures (not shown) for supporting one or more movable racks (not shown). A panel on the front surface of the housing 752 provides a user interface 700.

Figure 7B:
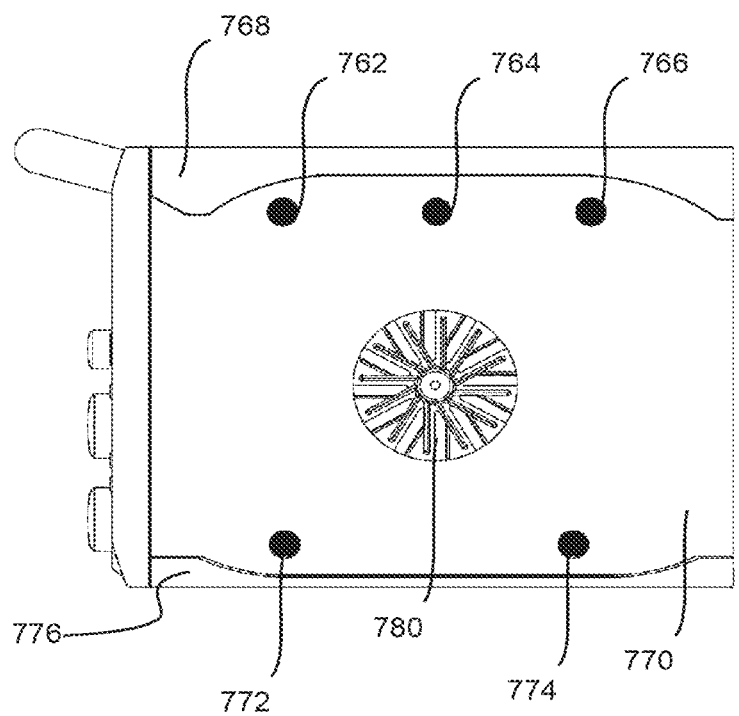
FIG. 7B shows a schematic cross section of the compact oven of FIG. 7A.

FIG. 7B is a schematic cross section of the compact oven 750 and illustrates the configuration of the heating elements. The oven can have, for example, between 2 and 6 heating elements arranged along the top and/or the bottom of the heating compartment, and that are made of quartz, stainless steel calrod, tungsten, etc. In the example shown, the oven has five quartz heating elements, three top elements 762, 764, 766, located adjacent the ceiling 768 of the heating compartment 770. Two bottom elements 772, 774 are located long the floor 776 of the heating compartment 770.

In this embodiment, the top front and rear elements 762 and 766, the middle element 764, and the bottom elements 772, 774 form 3 distinct groups that are controlled separately and can be utilised at variable power according to the mode of operation.

In some embodiments, the top front and rear elements 762, 766 provide up to 450 watts each and the middle element 764 provides 550 watts. In other embodiments, the top front element 762 provides 520 watt, the top rear element 766 provides 380 watt and the top central element 764 provides 550 watt.

various features relating to the operation of a compact oven are described in U.S. Pat. No. 8,878,106, incorporated herein by reference in its entirety. As described therein, the different modes of operation of the oven are used for different styles of cooking. For example, for the "toast" configuration, top front and rear elements 762, 766 and bottom elements 772, 774 are used at maximum power. In the toast configuration the oven rack is located in the middle position. For the "bake" configuration, these same top and bottom elements (excluding the middle element 764) are used, but with a different power configuration. In addition, the motorized convection fan 780 is used. The oven rack is located in the lowest position. For the "broil" (or "grill") configuration the oven rack is located in the uppermost position, the top three elements 762, 764, 766 are all on full power, and the bottom elements are inactive.

Figure 7C:
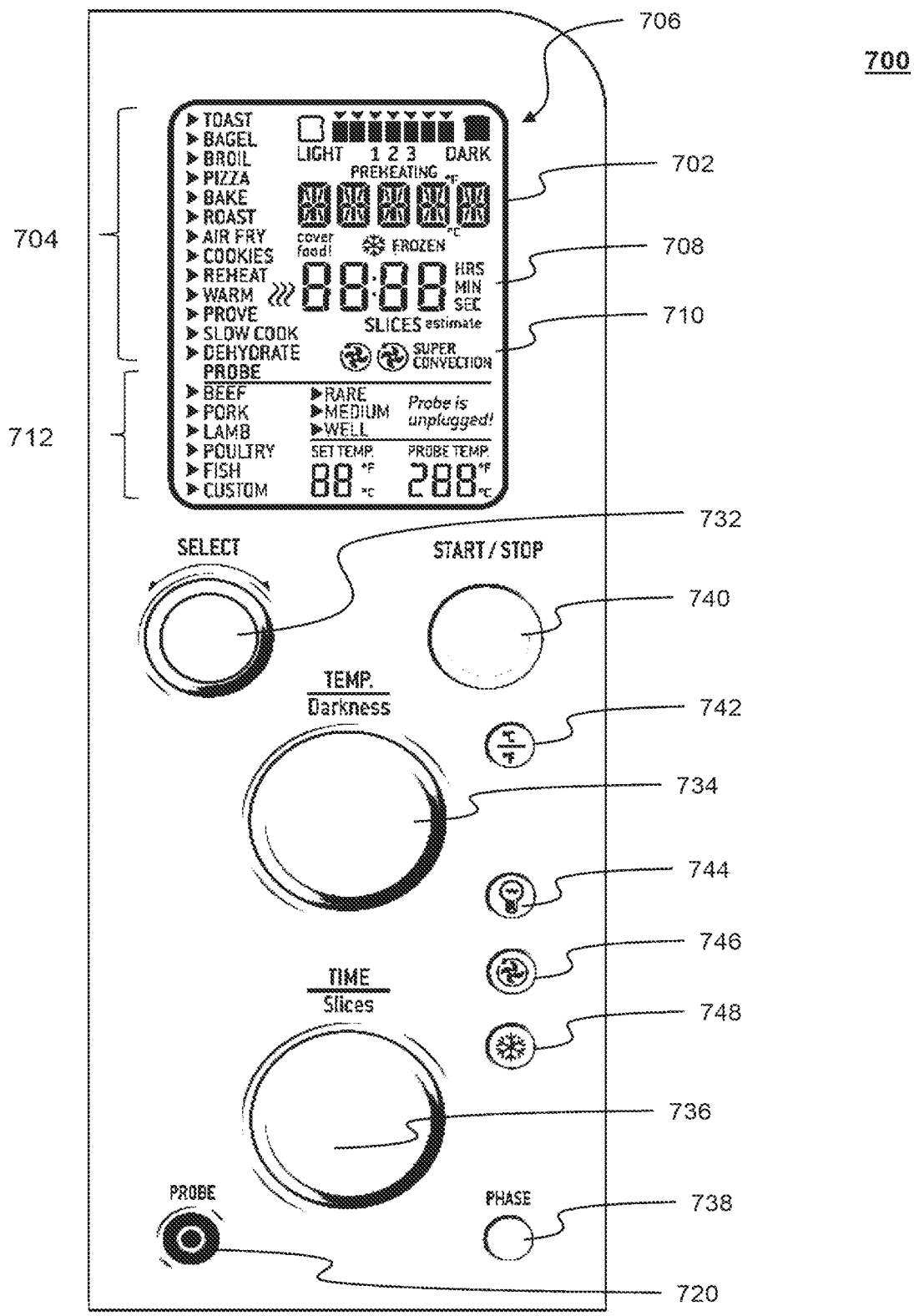
FIG. 7C shows a user interface of the compact oven shown in FIG. 7A.

FIG. 7C shows the user interface 700 in more detail. The display 702 provides feedback to the user regarding various aspects of the oven's operation, such as which mode 704 has been selected, the cooking temperature (or toasting amount) 706 that has been selected (in degrees Celsius or Fahrenheit depending on the selection made with button 742), a timer 708, fan setting (as selected with button 746), and information relating to a temperature probe as shown in the probe display 712. A removable temperature probe can be connected to the oven 750 at plug 720, the probe being usable to measure internal temperature of food being cooked in the oven 750. The measured temperature is shown on the probe display 712.

The user interface 700 includes a number of single- or multi-function dials 732, 734, 736 and buttons 738, 740, 742, 744, 746 and 748 for receiving user inputs defining the parameters according to which the oven will operate. Pre-programmed configurations can be selected by selecting a cooking mode 704 with the selection dial 732. These configurations can also be modified by the user with the use of one or both of the temperature dial 734 and the time dial 736, by selecting or deselecting the convection fan 780 using fan control button 746, and/or by selecting the defrost button 748. Light button 744 is used to turn on the oven's internal light.

Phase button 738 is used to concatenate cooking mode phases (also referred to as "stages" or "segments"). For example, if the food being cooked is first defrosted, then broiled, then roasted, and then kept in the oven to keep warm, four separated cooking modes can be programmed as four consecutive phases by entering a first setting, selecting the phase button 738, selecting a second setting, etc. In this way one compound cooking function is created from four simple cooking functions. Once the user settings have been selected, the start/stop button 740 initiates operation of the oven 750 according to the (simple or compound) user settings as selected using the user interface 700.

Following a single phase cooking operation or a multi-phase cooking sequence, a user can select the oven's "bit more" function (via a button or menu option, not shown here), resulting in a reactivation or continuation of cooking phase according to the user settings associated with the more recently performed phase. The additional amount of cooking time may be determined in any number of ways as appropriate for the specific style of cooking. For example, when toasting bread the oven will be set up with a toasting profile and the "bit more" function may result in a simple toasting operation of 1 or 2 more minutes, or 5-10% more time. For other cooking profiles such as roasting, where a temperature probe is used, the "bit more" additional time interval may be calculated based on a measured probe temperature profile, whereby the temperature profile is extrapolated in order to determine a time interval for achieving a certain increase in temperature, e.g. 2-6 degrees, or e.g. 5-10%.

In addition to the external temperature probe used to measure the temperature of the food, the oven 750 also includes one or more additional temperature sensors (such as negative temperature coefficient (NTC) sensors) inside the oven's heating compartment 770. The oven 750 may also include rack location sensors (not shown), which are typically mechanical sensors, for sensing the location of the oven rack (e.g. lowest, middle, highest position). Position sensors, such as mechanical sensors (not shown), may be used to sense the position of the oven door, for example where the oven door is held ajar during grilling/broiling.

Selection of the start/stop button 740 to start operation of the oven will initiate the recording feature. User settings as input via the user interface 700 are recorded along with measured parameters as sensed by the temperature, location and/or position sensors. Measurements from both the oven's internal temperature sensors as well as the temperature probe are recorded, and in some embodiments these may also be recorded as a temperature profile over time. For the temperature probe, a temperature profile will consist of discrete measurement points, each associated with a measurement time obtained from an oven and/or processor clock. In addition, any further user inputs received that modify the user settings during the operation of the oven will also be recorded (e.g. selection of a "bit more" function, or any other modifications, e.g. temperature changes, element selection, or moving the oven rack). When the start/stop button 740 of the oven is selected to stop operation of the oven, the user is provided with the option to save, modify or continue the recording.

during playback of a recorded sequence recorded parameters are compared to sensed parameters. For the location and position sensors that relate to the rack location and door position, parameter differences result in messages being displayed to the user. For differences in temperature or fan speed measurements, the processor 122 determines an adjustment to one or more user setting that would result in the sensed parameters to better approximate the recorded parameters, for example an increase in temperature, fan speed, or an increase in time.

The foregoing describes only some embodiments of the present invention, and modifications and/or changes can be made thereto without departing from the scope and spirit of the invention, the embodiments being illustrative and not restrictive.

one of ordinary skill in the art would appreciate that the example kitchen appliances described herein is a small selection of possible appliances in which the process 200 may be implemented.

The invention claimed is:

1. A method of operating a coffee machine comprising a coffee grinder, the method comprising:
    receiving, at a processor, a stored sequence of user settings configured to be applied to the coffee machine, the user settings including a stored sequence of a recorded parameter, the recorded parameter having been recorded while the coffee machine is in operation prior to receiving the stored sequence of user settings, wherein time intervals between each recorded value of the recorded parameter are recorded in the sequence of the recorded parameter, and wherein the user settings are associated with the recorded parameter;
    displaying, in the form of a graph, the stored sequence of user settings and/or the stored sequence of the recorded parameter at a display of the coffee machine or a remote computing device;
    segmenting, by a user, the stored sequence of user settings and/or the stored sequence of the recorded parameter into segments, the stored sequence of the user settings and/or the stored sequence of recorded parameter being segmented based on user input;
    displaying, on the display, the segments on the graph;
    storing the segmented sequence of user settings and/or the segmented sequence of the recorded parameter; and
    operating the coffee machine based on the segmented sequence of user settings and/or the segmented sequence of the recorded parameter, wherein the recorded parameter includes grind settings, brew settings, and/or frothing settings.

2. The method of claim 1, wherein the user input includes placement of a marker or cursor on the graph.

3. The method of claim 2, wherein the graph is segmented at or around where the marker or cursor is placed.

4. The method of claim 1, wherein the segments are used to generate a text representation of the stored sequence of user settings as distinct recipe steps, each recipe step being associated with at least one of the segments.

5. The method of claim 1 further comprising:
    amending and/or annotating, by the user, the stored sequence of user settings which is then displayed as a recipe on the display.

6. The method of claim 5, further comprising:
    modifying, by the user, the recipe.

7. The method of claim 1, wherein the segments are analysed and a preparation style is attributed to one or more of the segments.

8. The method of claim 7, wherein the segments are analysed by comparing the stored sequence of user settings with a look-up table to identify the preparation style to be attributed to the one or more of the segments.

9. The method of claim 1, further comprising:
    setting, by the user, a segment transition criteria for transitioning from one of the segments to a next segment.

10. The method of claim 9, wherein the segment transition criteria includes a delay in transitioning from one of the segments to the next segment until a sensed parameter value is reached.

11. The method of claim 9, wherein the segment transition criteria includes a rate of change of a sensed parameter.

* * * * *